United States Patent
Inoue et al.

(10) Patent No.: US 7,518,683 B2
(45) Date of Patent: Apr. 14, 2009

(54) LIQUID CRYSTAL DISPLAY DEVICE, FABRICATION METHOD THEREOF, AND HARD MASK

(75) Inventors: Iichiro Inoue, Nara (JP); Shinichi Terashita, Kyoto (JP); Hiroyuki Hakoi, Nara (JP); Koichi Miyachi, Kyoto (JP); Akihito Jinda, Nara (JP); Takako Koide, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 534 days.

(21) Appl. No.: 10/989,743

(22) Filed: Nov. 17, 2004

(65) Prior Publication Data
US 2005/0146662 A1 Jul. 7, 2005

(30) Foreign Application Priority Data

Nov. 17, 2003 (JP) .............................. 2003-387264
Mar. 31, 2004 (JP) .............................. 2004-108141
Nov. 12, 2004 (JP) .............................. 2004-329825

(51) Int. Cl.
*G02F 1/1337* (2006.01)

(52) U.S. Cl. ................... 349/129; 349/123; 349/124; 349/125; 349/126; 349/127; 349/128; 349/130; 349/187

(58) Field of Classification Search ......... 349/123–130, 349/187
See application file for complete search history.

(56) References Cited

U.S. PATENT DOCUMENTS

| 5,473,455 | A | * | 12/1995 | Koike et al. | ................ | 349/124 |
| 5,844,650 | A | * | 12/1998 | Saito et al. | ................ | 349/126 |
| 5,877,836 | A | * | 3/1999 | Miura et al. | ................ | 349/184 |
| 6,287,649 | B1 | | 9/2001 | Fukushima et al. | | |
| 6,288,762 | B1 | * | 9/2001 | Sasaki et al. | ................ | 349/129 |
| 2004/0246421 | A1 | * | 12/2004 | Inoue et al. | ................ | 349/129 |

FOREIGN PATENT DOCUMENTS

| JP | 1-102521 A | 4/1989 |
| JP | 2-141726 A | 5/1990 |
| JP | 7-239474 | 9/1995 |
| JP | 10-301113 | 11/1998 |
| JP | 11-352486 | 12/1999 |
| JP | 2002-277877 | 9/2002 |

* cited by examiner

*Primary Examiner*—David Nelms
*Assistant Examiner*—Thanh-Nhan P Nguyen
(74) *Attorney, Agent, or Firm*—Nixon & Vanderhye P.C.

(57) ABSTRACT

A liquid crystal display device with an alignment film provided on at least one of a pair of substrates, sandwiching a liquid crystal layer, on the side facing the liquid crystal layer, in which the alignment film aligns liquid crystal molecules in the liquid crystal layer substantially vertical or horizontal when there is no voltage application, and a mask rubbing process is performed with at least a part of a hard mask adhered to the alignment film surface such that alignment control directions in regions of the alignment film are different from each other.

42 Claims, 23 Drawing Sheets

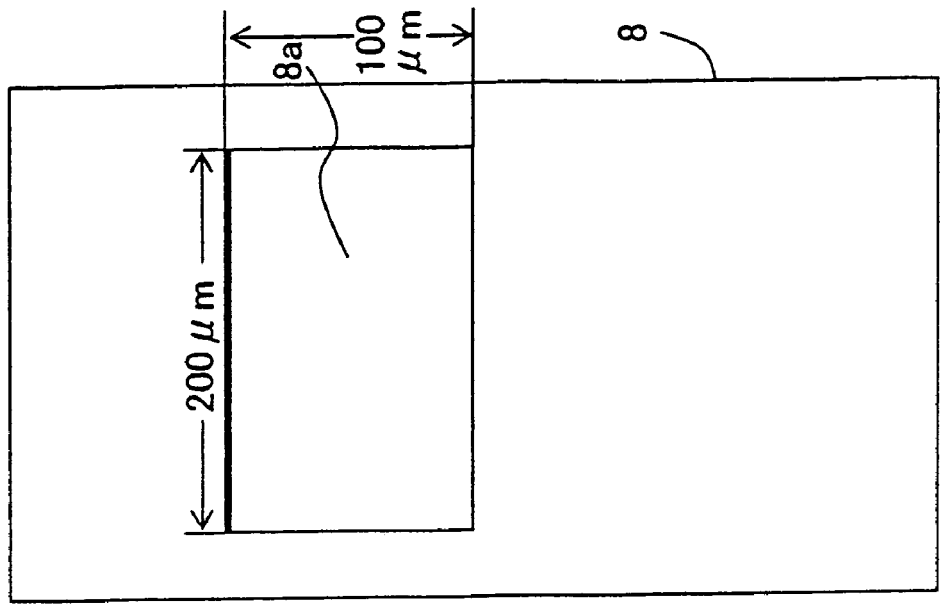
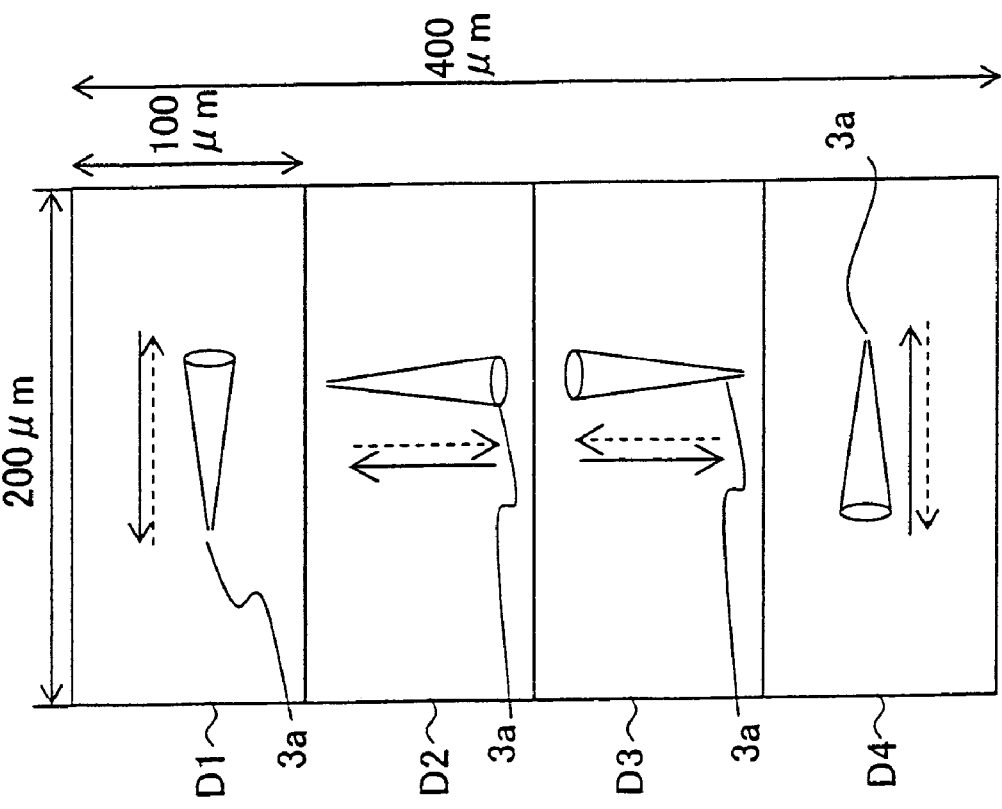

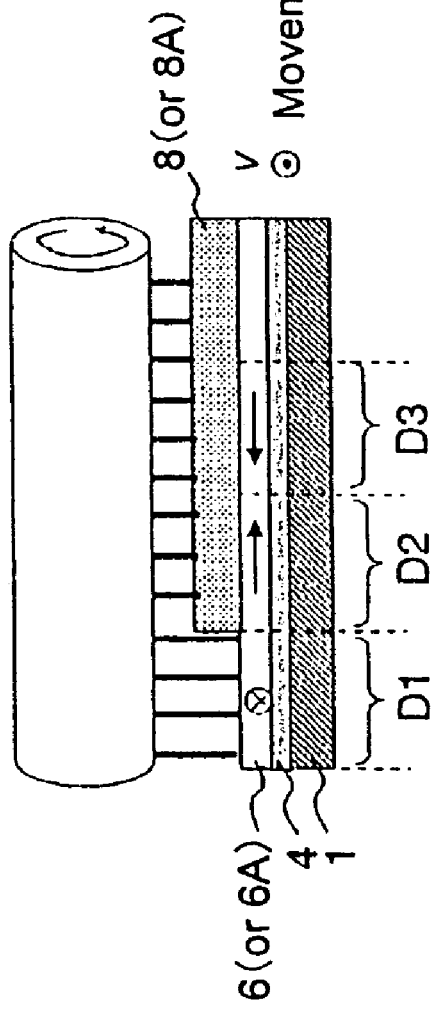
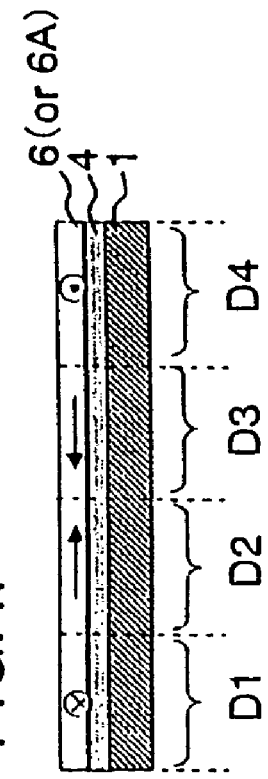
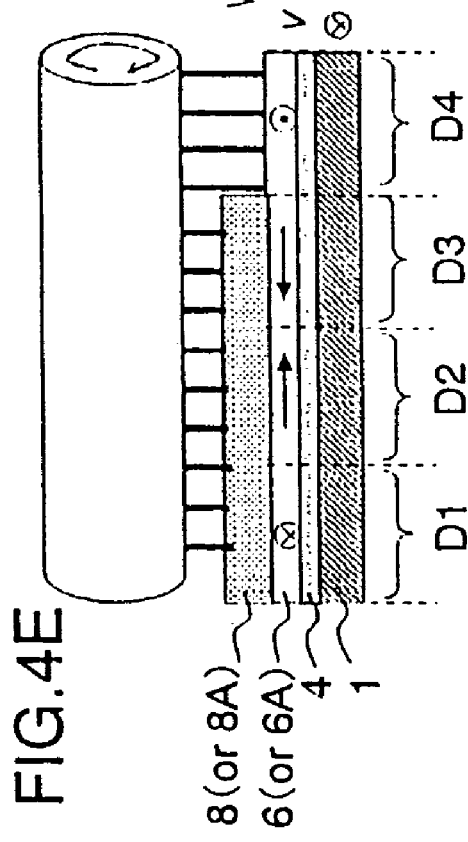

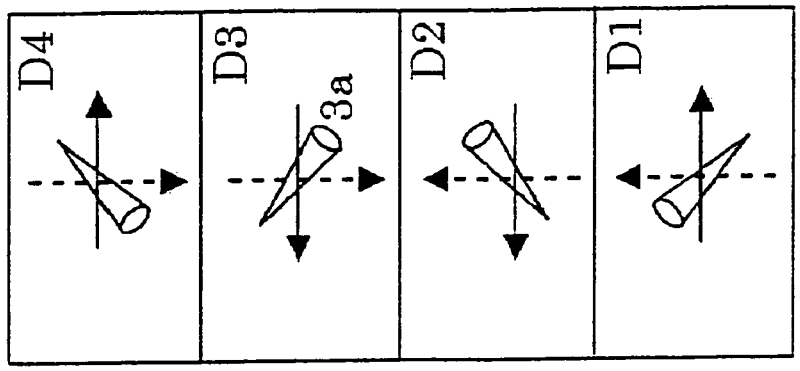
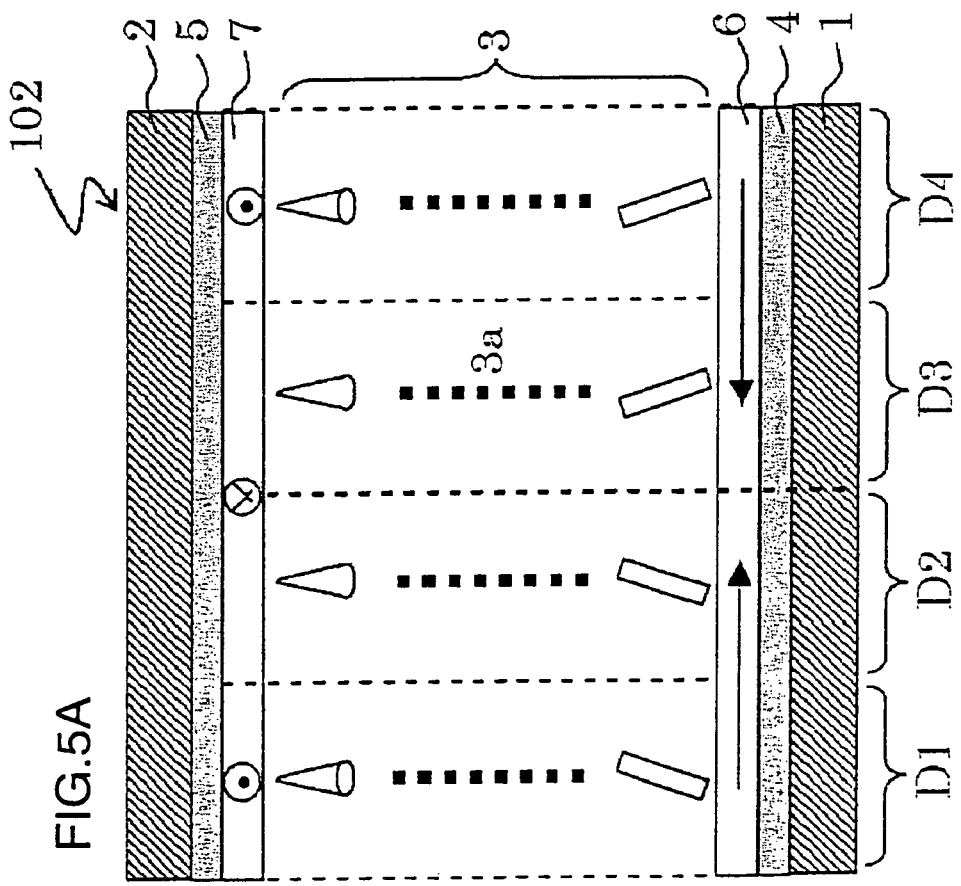

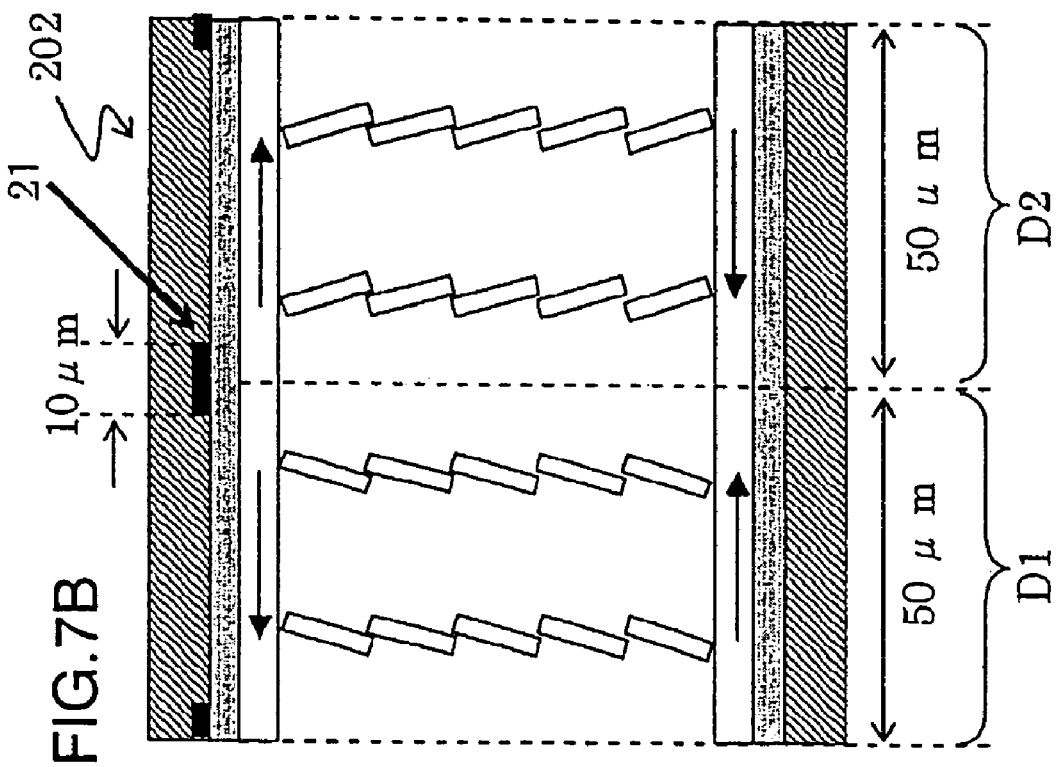
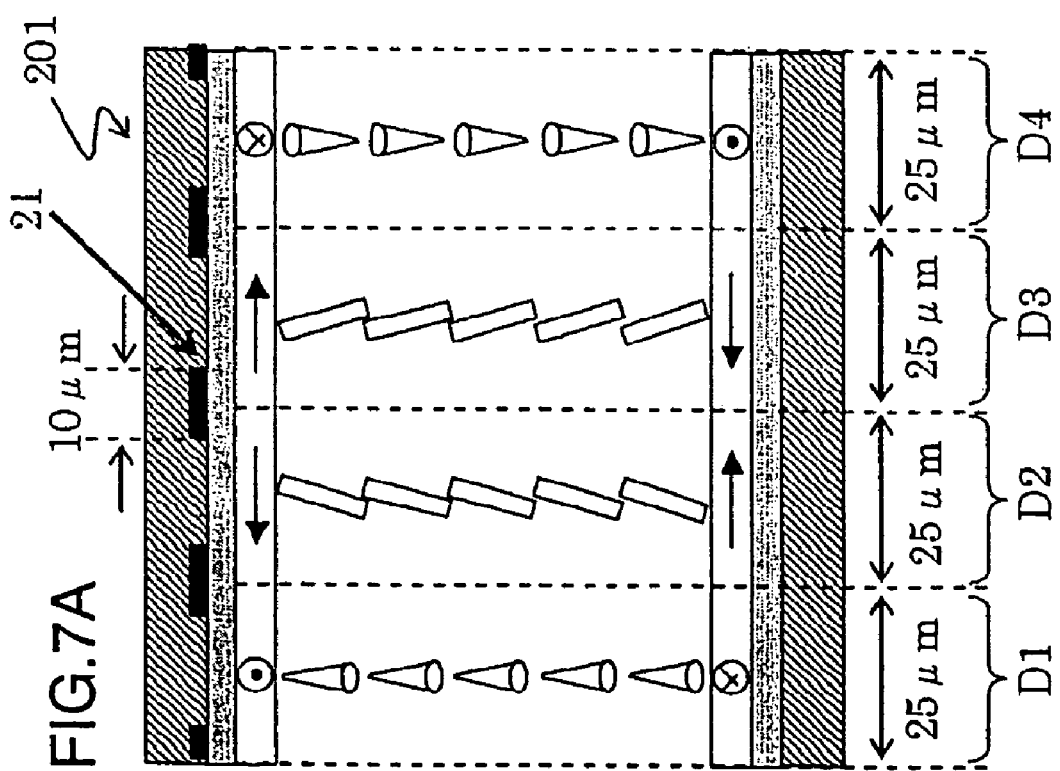

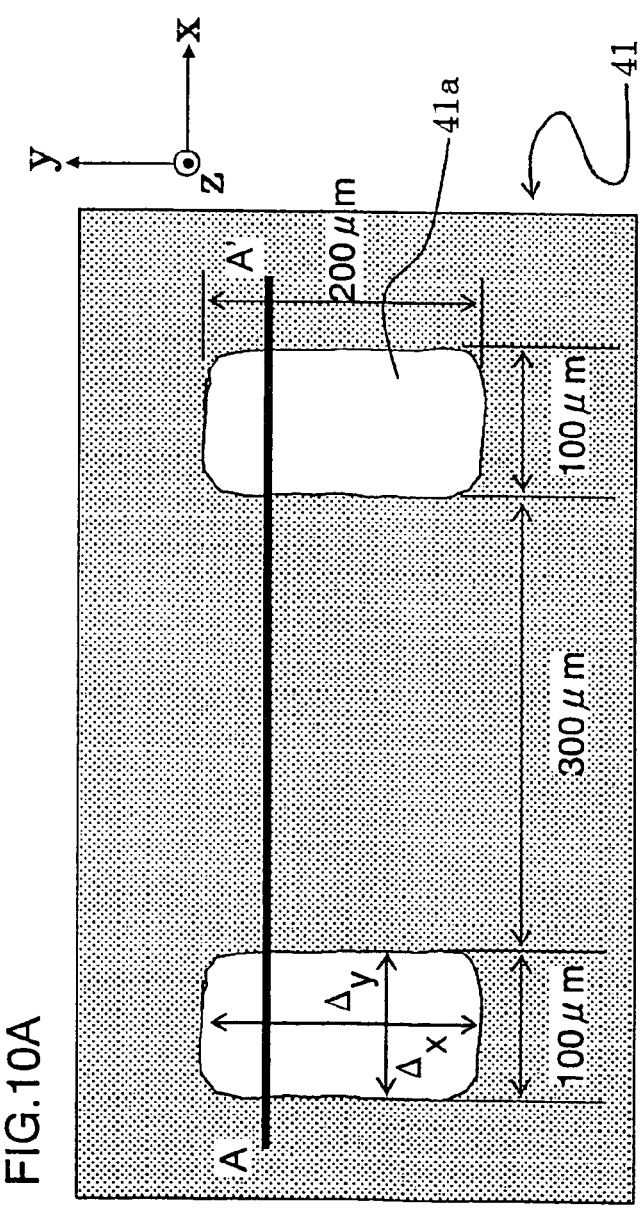
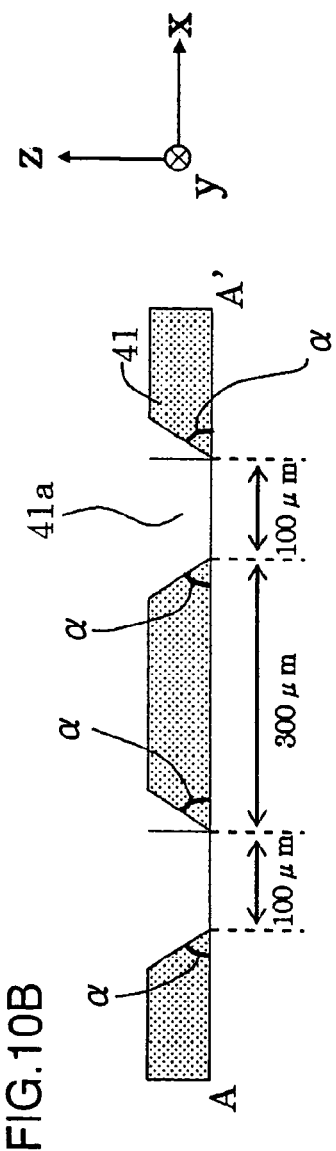
FIG.10A
FIG.10B

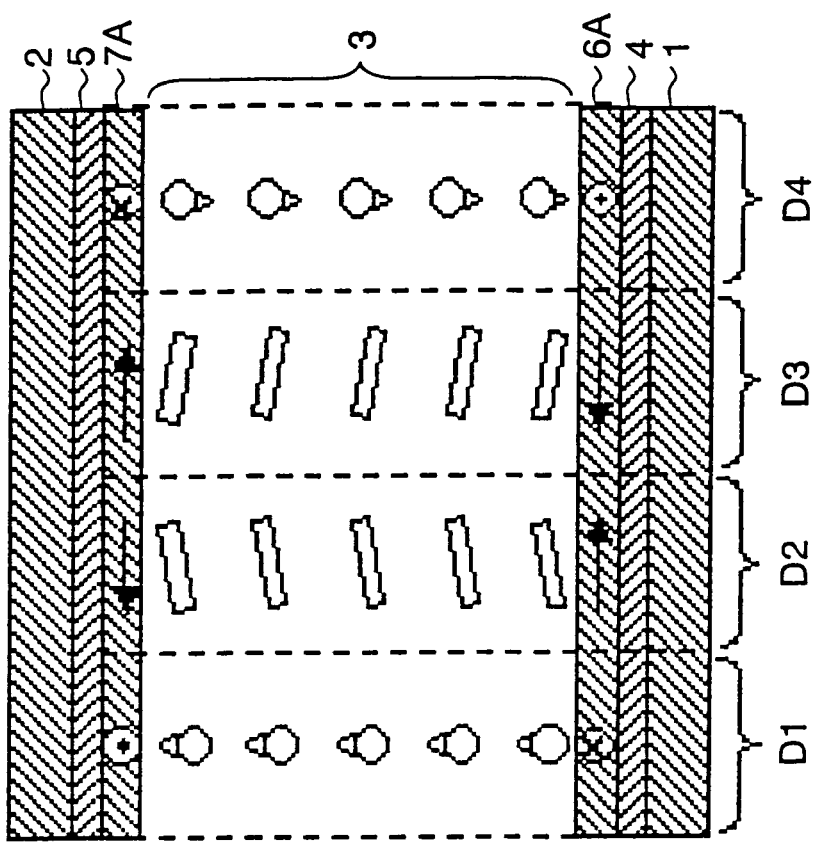
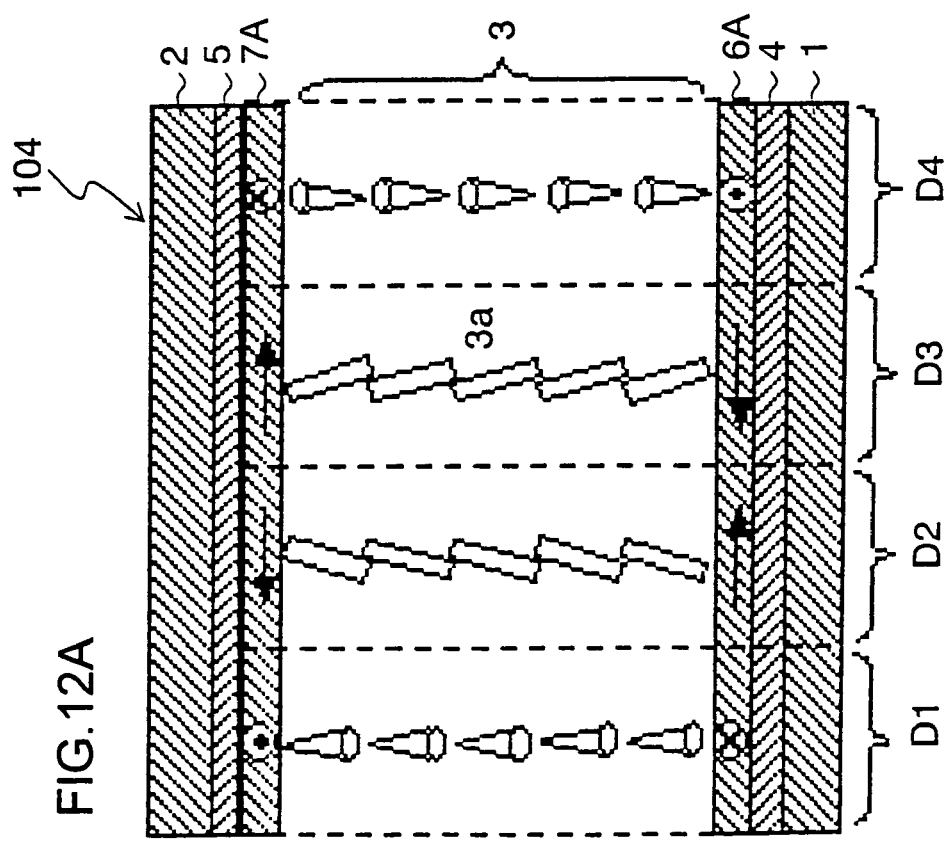

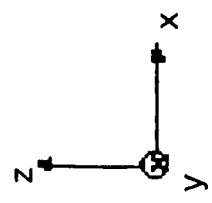
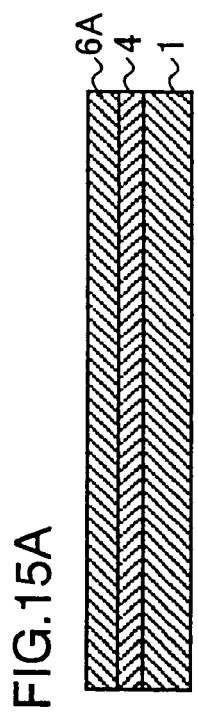
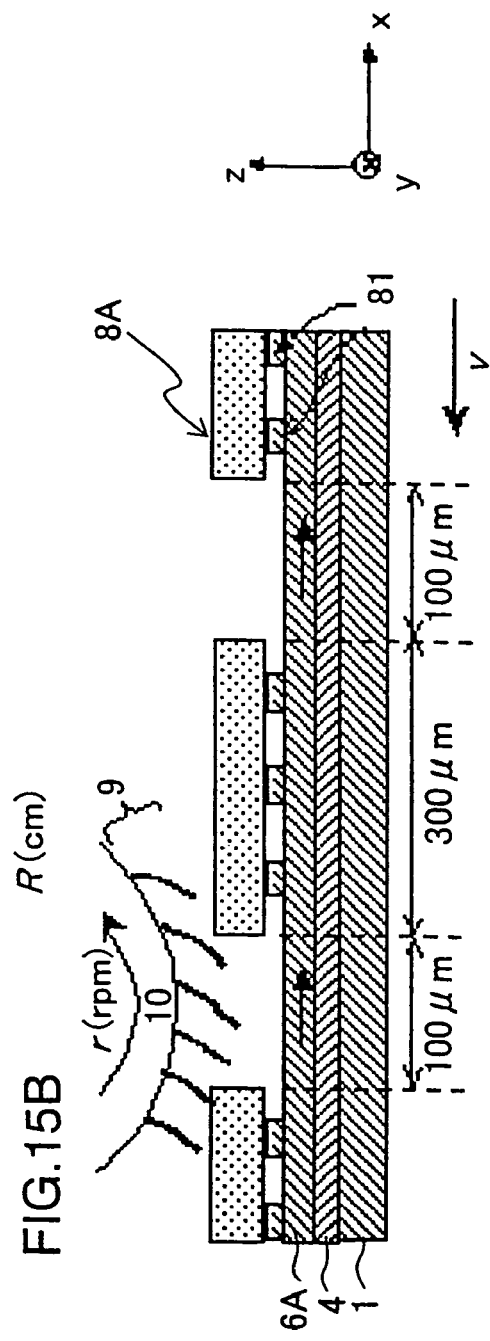
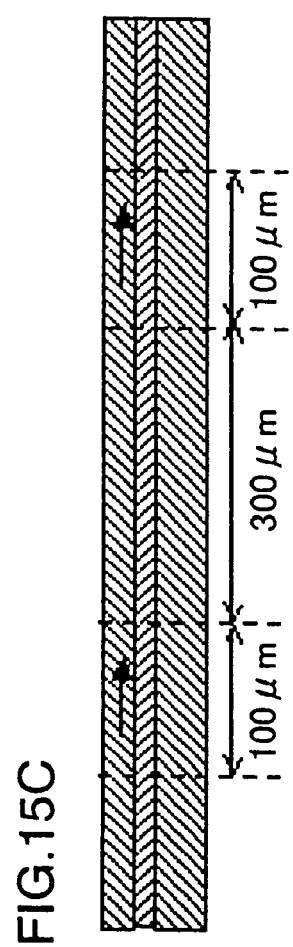
FIG.15A
FIG.15B
FIG.15C

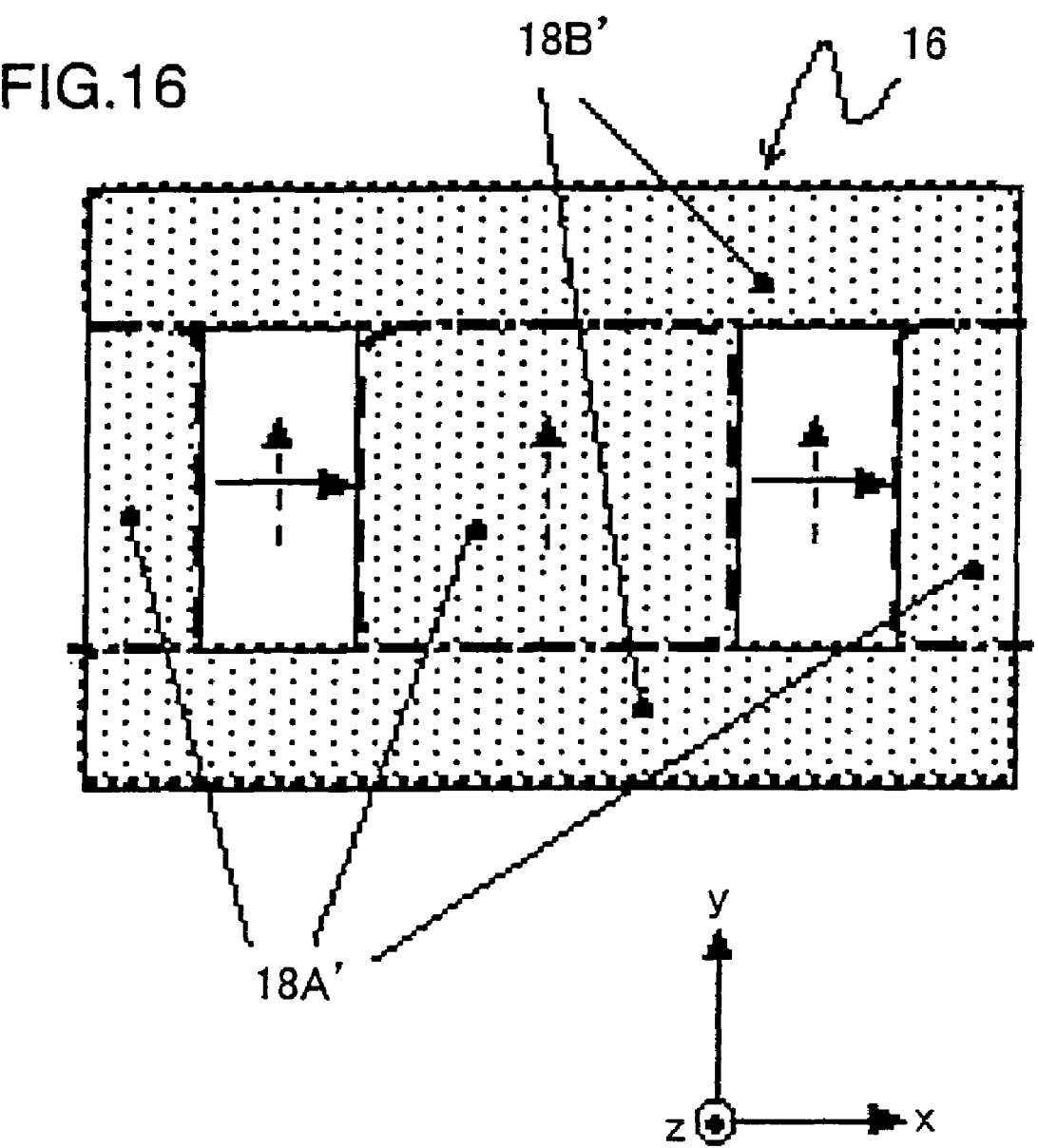

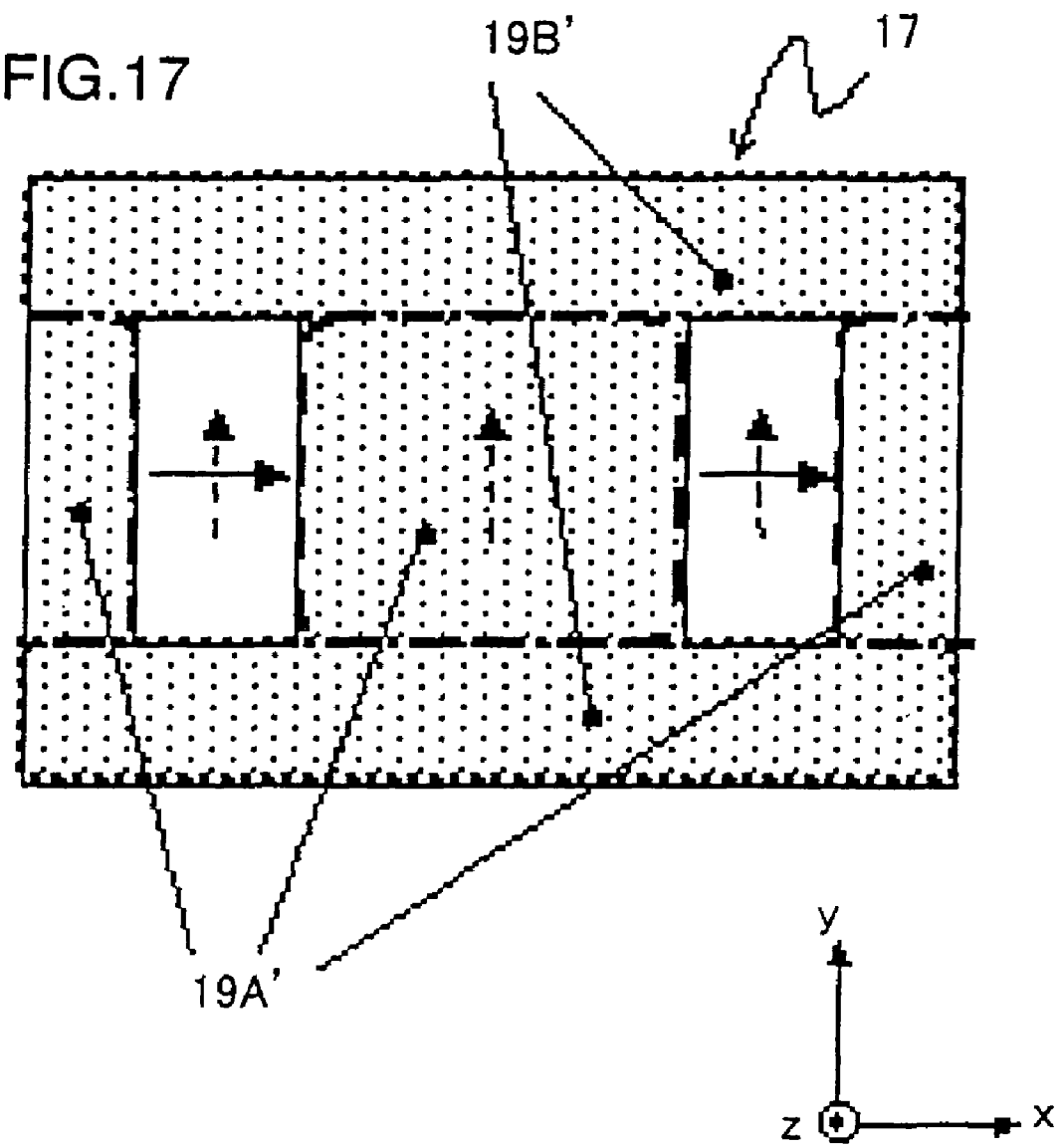

FIG.18
Before voltage application
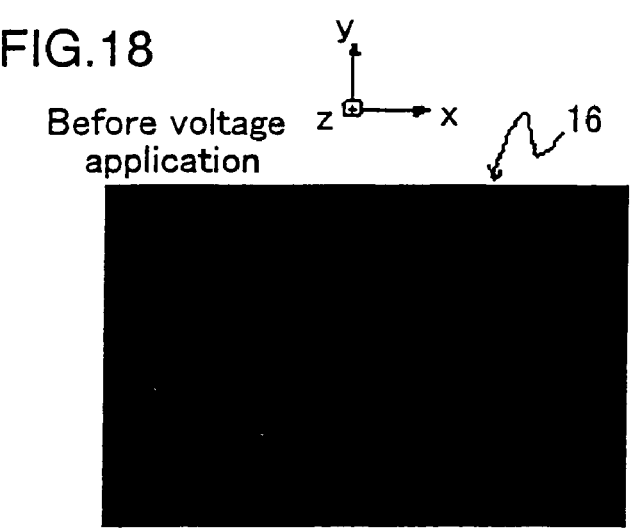
Immediately after voltage application
Disclination
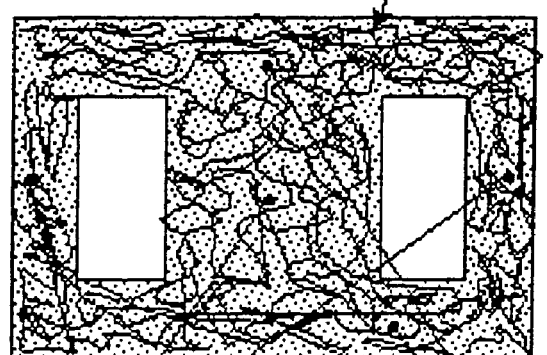
18A'  18B'
Steady state after voltage application

LIQUID CRYSTAL DISPLAY DEVICE, FABRICATION METHOD THEREOF, AND HARD MASK

This Nonprovisional application claims priority under 35 U.S.C. §119(a) on Patent Application No. 2003-387264 filed in Japan on Nov. 17, 2003, Patent Application No. 2004-108141 filed in Japan on Mar. 31, 2004 and Patent Application No. 2004-329825 filed in Japan on Nov. 12, 2004, the entire contents of which are hereby incorporated by reference.

BACKGROUND OF THE INVENTION

1. Field of the Invention

The present invention relates to a liquid crystal display device of multi-domain mode and a fabrication method thereof, and a hard mask used for the same, and particularly, a liquid crystal display device having both a wide viewing angle and rapid response property and a fabrication method thereof, and a hard mask used for the same.

2. Description of the Related Art

A liquid crystal display device using a nematic liquid crystal was first used in a numerical segment display device such as a clock, a calculator, and the like. Now, it has become more widely used as a display device for a monitor of a notebook-sized personal computer (PC) or a desktop personal computer, having the advantages of a small occupying space and low power consumption. Particularly, in the market of a display device for a monitor of a desktop PC, a conventional cathode-ray tube (CRT) monitor is being replaced by an LCD monitor. Such a trend is also seen in the market of televisions, in which the CRT has been dominant. Manufactures are increasing research and development to replace a CRT-TV with an LCD-TV.

For an LCD-TV to be more widely used, a rapid response property which may support a motion picture, and a wide viewing angle which does not depend on an angle at which a viewer watches a screen, are the major issues. These are essential problems which are related to an electro-optic property of a liquid crystal, and various proposals have been submitted. However, a liquid crystal display which can provide both a rapid response property and a wide viewing angle is not embodied at the moment.

For example, regarding the rapid response property, among a liquid crystal display mode using a nematic liquid crystal, an optically compensated birefringence (OCB) mode disclosed in Japanese Laid-Open Publication No. 11-7018 is the best. In the OCB mode, when a predetermined voltage is applied to a liquid crystal layer, liquid crystal molecules near an alignment film are inclined symmetrically at both substrates to form a bend alignment. Since the bend alignment is formed in this way, a change of liquid crystal molecules, which corresponds to a change in a driving voltage applied to the liquid crystal layer, becomes fast, and a rapid response property, for example, a few msec, can be achieved. However, this OCB mode still has problems in terms of front contrast, viewing angle, uniformity of display, or the like.

On the other hand, in a liquid crystal display device disclosed in Japanese Laid-Open Publication No. 10-301113, liquid crystal molecules are aligned vertical to a surface of a substrate without a driving voltage being applied to a liquid crystal layer. Thus, a leakage of light is not likely to occur in a black display state, and the display device has a high contrast property. Furthermore, in a liquid crystal display device disclosed in Japanese Laid-Open Publication No. 10-301113, two domains each have liquid crystal molecules arranged at an angle different from each other by 180°. In a border region between these two domains, a small domain having liquid crystal molecules arranged in a direction perpendicular to both of the directions of the liquid crystal molecules of the above two domains is formed. In this way, a property of a viewing angle and a response property are improved.

Japanese Laid-Open Publication No. 11-352486 discloses a liquid crystal display device of a vertical alignment (VA) mode. In this liquid crystal display device, regions having alignment regulation forces in different directions are provided on vertical alignment films on a pair of substrates, which oppose each other with a liquid crystal layer sandwiched in between, by a mask rubbing process, or the like, to form four domains having different alignment directions of liquid crystal molecules positioned near the middle of a thickness direction of the liquid crystal layer when a voltage is applied. Japanese Laid-Open Publication No. 11-352486 describes that, mainly, any of a mask rubbing method by a photolithograpy method on a vertical alignment film, an ion beam method, and a light illumination method may be used as a pixel separation method. Japanese Laid-Open Publication No. 11-352486 describes that by forming domains having different alignment directions of liquid crystal molecules, a liquid crystal display device having an improved viewing angle property, and which can display at a high definition, can be achieved.

In Japanese Laid-Open Publication No. 2002-277877, a picture element has quartered domains. Therein, four domains having different alignment directions of liquid crystal molecules positioned near the middle of a thickness direction of a liquid crystal layer to be twist-aligned positioned sequentially in one direction. Substrates are bonded to each other such that a border of alignment regions on one substrate overlaps an alignment region of the other substrate vertically. Thus, a quartered domains RTN mode having different alignment states of the liquid crystal molecules is implemented. Japanese Laid-Open Publication No. 2002-277877 describes that, by combining vertical alignment and alignment split as such, a viewing angle can be increased, a display definition can be improved, and contrast can be improved.

Japanese Laid-Open Publication No. 7-2394747 describes a fabrication method of a liquid crystal display device of a multi-domain TN mode using a horizontal alignment film. In the method, at least one of a pair of substrates is subjected to a rubbing process at least once, the rubbing process is performed using a rubbing cloth through a plate having a mask portion having a stripe shape (non-opened portion) and an opening. For example, an opening provided by setting a stainless steel mask with tensions applied from both sides, and thus, the stainless steel mask being slightly lifted above the substrate can be used.

However, the present inventors have found that the conventional liquid crystal display device disclosed in Japanese Laid-Open Publication No. 10-301113 has the problem that a disclination line is generated between domains by applying/cutting of a voltage. As a result, there is a problem that, when a display surface is viewed at an angle, a display is seen to have a rough surface from any direction. Further, if a disclination line is generated badly, there is a problem that a display definition depends on a viewing angle.

In the conventional liquid crystal display device of Japanese Laid-Open Publication Nos. 10-301113, 11-352486, and 2002-277877, a pixel is split (domain is formed) to achieve a wide viewing angle. An alignment process for that purpose is mainly performed by a method of forming a pattern of a resist film by a photolithography method on a vertical alignment film and performing a mask rubbing process.

However, a rubbing method using a resist film with a pattern formed by a photolithography process requires a chemical process for developing or peeling a resist, and the like (a process to remove a portion to be rubbed by etching or the like). This causes damage on an alignment film surface, and an alignment regulation force cannot be controlled well. The present inventors conducted a detailed study, and have found that, in a portion of an alignment film which is protected by a photoresist and a portion which is not protected, the states of interfaces between an alignment film and a liquid crystal layer are different, and tilt angles and anchoring properties are different. This results in a difference in response properties and/or a difference in voltage/transmittance properties between split domains. Thus, the response property has not been improved as expected. Particularly, at a low temperature, for example, around 0° C., the response becomes significantly slow. Thus, it is shown that the above liquid crystal display device is not suitable for use as a liquid crystal display television.

As a method for performing an alignment process, a method of performing light illumination using an photo alignment film material having functional groups which react to ultraviolet rays having a certain wavelength or a bias direction, for example, can also be considered. However, an photo alignment film has problems that its reliability, retention property, or the like, is low.

Japanese Laid-Open Publication No. 11-352486 describes a mask rubbing process using a metal hard mask. Japanese Laid-Open Publication No. 2002-277877 describes performing a mask rubbing process with the necessary regions covered with a mask. However, a method using a resist film with a pattern formed by a photolithography process as a mask is mainly used. Currently, improving a response property, reliability, and the like, by performing a rubbing process using only a hard mask, as in the present invention, is not considered at all.

In Japanese Laid-Open Publication No. 7-2394747, in order to suppress damages of a stainless steel mask caused by the rubbing cloth, two ends of the stainless steel mask are pulled by a tension application mechanism (for example, a spring) and tension is applied on a substrate. As a result, a rubbing process is performed on the alignment film surface through an opening of the stainless steel mask with the stainless steel mask slightly lifted from an alignment film surface, and, particularly, a rubbing process region becomes wider than the width of the actual opening on both sides of the width direction relative to a rubbing direction of the opening of the stainless steel mask. Thus, there is a problem that a dimension precision cannot be achieved in the rubbing process region.

SUMMARY OF THE INVENTION

According to the present invention, there is provided a liquid crystal display device with an alignment film provided on at least one of a pair of substrates, sandwiching a liquid crystal layer, on the side facing the liquid crystal layer, wherein: the alignment film aligns liquid crystal molecules in the liquid crystal layer substantially vertical or horizontal when there is no voltage application, and a mask rubbing process is performed with at least a part of a hard mask adhered to the alignment film surface such that alignment control directions in regions of the alignment film are different from each other.

In one aspect of the present invention, the liquid crystal layer forms a plurality of domains in accordance with the alignment control directions defined by the mask rubbing process.

In one aspect of the present invention, the alignment control directions are different from each other within one pixel portion.

In one aspect of the present invention, the plurality of domains include any of two to four domains which have the alignment control directions different from each other within one pixel.

In one aspect of the present invention, the four domains are sequentially formed adjacent to each other in one direction.

In one aspect of the present invention, the four domains are formed into a squared plus shape.

In one aspect of the present invention, the liquid crystal layer in the plurality of domains has an alignment state of parallel alignment when a voltage of a predetermined threshold value or higher is applied.

In one aspect of the present invention, the liquid crystal layer in the plurality of domains has an alignment state of twist alignment when a voltage of a predetermined threshold value or higher is applied.

In one aspect of the present invention, outer peripheral portions of the plurality of domains are located in non-display portions.

According to another aspect of the present invention, there is provided a fabrication method of a liquid crystal display device which displays with an alignment change in a liquid crystal layer between a pair of substrates, comprising: forming an alignment film on at least one of the pair of the substrates; and performing a mask rubbing process by locating a hard mask, having an opening portion, such that at least part of the hard mask contacts the alignment film, and performing the mask rubbing process on the alignment film through the opening portion.

In one aspect of the present invention, the hard mask includes shock-absorbing sections on a non-opened surface on the side facing the alignment film.

According to still another aspect of the present invention, there is provided a fabrication method of a liquid crystal display device including a pair of substrates, a liquid crystal layer provided between the pair of substrates, and an alignment film which is provided on at least one of the pair of the substrates on a side facing the liquid crystal layer and which forms a plurality of domains having directions, in which liquid crystal molecules of the liquid crystal layer incline when a voltage of a predetermined threshold value or higher is applied, different from each other, the method comprising: performing a mask rubbing process by laminating a hard mask, including an opening portion and shock-absorbing sections in non-opened portions, for forming domains such that the shock-absorbing sections contact the alignment film surface, and performing the mask rubbing process on the alignment film through the opening portion of the hard mask.

In one aspect of the present invention, the alignment film is at least a vertical alignment film or a horizontal alignment film.

In one aspect of the present invention, the fabrication method of a liquid crystal display device further comprises bonding the pair of substrates after the mask rubbing process with a predetermined interval therebetween and enclosing a liquid crystal layer in a gap between the substrates.

In one aspect of the present invention, the mask rubbing process is performed for a plurality of times with the positions of the opening portion located with respect to the alignment film sequentially changed.

In one aspect of the present invention, the mask rubbing process is performed with the positions of the opening portion of the hard mask shifted so as to locate the opening portion at a predetermined rubbing position.

In one aspect of the present invention, the mask rubbing process is performed when the hard mask is replaced with a hard mask having an opening portion at different positions so as to locate the opening portion at a predetermined rubbing position.

In one aspect of the present invention, the opening portion is located for each of pixel portions, or a plurality of sub-pixel portions forming the pixel portions to perform the mask rubbing process.

In one aspect of the present invention, the size of the opening portion is determined in accordance with a pixel size and a pixel pitch.

In one aspect of the present invention, the opening portion is set to be larger than a size of a pixel portion or a sub-pixel portion so that actual rubbing process region has the size of the pixel portion or sub-pixel portion.

In one aspect of the present invention, the thickness of the hard mask is between 30 μm to 50 μm, inclusive.

In one aspect of the present invention, the hard mask has a predetermined opening portion formed by an etching method.

In one aspect of the present invention, the hard mask is a metal mask produced by an electroforming method.

In one aspect of the present invention, a cross section of the opening portion has a taper angle less than 90°.

In one aspect of the present invention, a cross section of the opening portion has a taper angle of 60° to 70°, inclusive.

In one aspect of the present invention, a shock-absorbing section is formed in parts of the non-opened portion of the hard mask on a side facing the alignment film.

In one aspect of the present invention, the shock-absorbing section is formed in the non-opened portion of the hard mask on the side facing the alignment film so as to contact an alignment film surface corresponding to a non-display portion in a pixel of the liquid crystal display device.

In one aspect of the present invention, a shock-absorbing section is formed on the non-opened portion of the hard mask across an entire surface of a side facing the alignment film.

In one aspect of the present invention, the opening portion is provided to be larger than a domain by a predetermined amount with respect to the performing alignment process in the rubbing direction.

In one aspect of the present invention, the predetermined amount is larger at an upstream side of the rubbing direction than at a downstream side with respect to the domain.

In one aspect of the present invention, the liquid crystal display device is a vertical alignment type liquid crystal display device in which liquid crystal molecules of the liquid crystal layer are aligned substantially vertical to principle surfaces of the pair of the substrates when there is no voltage application.

In one aspect of the present invention, the liquid crystal display device is a horizontal alignment type liquid crystal display device in which liquid crystal molecules of the liquid crystal layer are aligned substantially parallel to principle surfaces of the pair of the substrates when there is no voltage application.

In one aspect of the present invention, the alignment film is at least a vertical alignment film or a horizontal alignment film.

In one aspect of the present invention, the fabrication method of a liquid crystal display device further comprises bonding the pair of substrates after the mask rubbing process with a predetermined interval therebetween and enclosing a liquid crystal layer in a gap between the substrates.

In one aspect of the present invention, the mask rubbing process is performed for a plurality of times with positions of the opening portion located with respect to the alignment film sequentially changed.

In one aspect of the present invention, the mask rubbing process is performed with the positions of the opening portion of the hard mask shifted so as to locate the opening portion at a predetermined rubbing position.

In one aspect of the present invention, the mask rubbing process is performed when the hard mask is replaced with a hard mask having an opening portion at different positions so as to locate the opening portion at a predetermined rubbing position.

In one aspect of the present invention, the opening portion is located for each of a pixel portion, or a plurality of sub-pixel portions forming the pixel portion to perform the mask rubbing process.

In one aspect of the present invention, the size of the opening portion is determined in accordance with a pixel size and a pixel pitch.

In one aspect of the present invention, the opening portion is set to be larger than a size of a pixel portion or sub-pixel portion so that an actual rubbing process region has the size of the pixel portion or sub-pixel portion.

In one aspect of the present invention, a thickness of the hard mask is between 30 μm to 50 μm, inclusive.

In one aspect of the present invention, the hard mask has a predetermined opening portion formed by an etching method.

In one aspect of the present invention, the hard mask is a metal mask produced by an electroforming method.

In one aspect of the present invention, a cross section of the opening portion has a taper angle less than 90°.

In one aspect of the present invention, a cross section of the opening portion has a taper angle of 60° to 70°, inclusive.

In one aspect of the present invention, the shock-absorbing section is formed in parts of the non-opened portion of the hard mask on a side facing the alignment film.

In one aspect of the present invention, the shock-absorbing section is formed in the non-opened portion on the side facing the alignment film so as to contact the alignment film surface corresponding a non-display portion in a pixel of the liquid crystal display device.

In one aspect of the present invention, the shock-absorbing section is formed on the non-opened portion of the hard mask across an entire surface of a side facing the alignment film.

In one aspect of the present invention, the opening portion is provided to be larger than a domain by a predetermined amount with respect to the performing alignment process in the rubbing direction.

In one aspect of the present invention, the predetermined amount is larger at an upstream side of the rubbing direction than at a downstream side with respect to the domain.

In one aspect of the present invention, the liquid crystal display device is a vertical alignment type liquid crystal display device in which liquid crystal molecules of the liquid crystal layer are aligned substantially vertical to principle surfaces of the pair of the substrates when there is no voltage application.

In one aspect of the present invention, the liquid crystal display device is a horizontal alignment type liquid crystal display device in which liquid crystal molecules of the liquid crystal layer are aligned substantially parallel to principle surfaces of the pair of the substrates when there is no voltage application.

According to still another aspect of the present invention, there is provided a hard mask including one or a plurality of opening portions for a rubbing process at one or a plurality of predetermined positions and a surface which contacts an actual rubbing process region in parts or entirety in a non-opened portion other than the one or plurality of opening portions.

In one aspect of the present invention, the one or each opening portion is set to be larger than a predetermined size by a predetermined amount so that the actual rubbing process region has the predetermined size.

In one aspect of the present invention, a shock-absorbing section is provided an at least a part of a surface in contact with the actual rubbing process region.

In one aspect of the present invention, the shock-absorbing section is provided so as to protrude as a rib.

In one aspect of the present invention, the shock-absorbing section is made of an elastic member.

In one aspect of the present invention, a thickness of the hard mask is between 30 μm to 50 μm, inclusive.

In one aspect of the present invention, a cross section of the opening portion has a taper angle of 60° to 70°, inclusive.

In one aspect of the present invention, ribs having same protruding directions and are lower than the rib are further protruded to be provide on the same protruding portion on the edge portions on both sides of the or each opening portion with respect to a rubbing direction.

Now, the effects of the present invention having the above-described structure will be described.

According to the present invention, it becomes possible to perform a rubbing process mechanically and directly on a desired region by locating a hard mask having predetermined opening portions on the alignment film, and performing a mask rubbing process in a predetermined direction. In this way, domains in which liquid crystal molecules are stably inclined along alignment control directions defined by the mask rubbing process can be formed, and a response speed increases significantly.

By providing a plurality of domains in a liquid crystal layer, and setting alignment states in the domains, when a driving voltage having a threshold value or higher is applied to a parallel alignment or twist alignment, it becomes possible to make the optical response properties in different domains the same.

For example, by splitting the inclination direction of the liquid crystal molecules within one pixel, when a voltage is applied, into a plurality of different directions, for example, four directions, a very wide viewing angle can be achieved because the viewing angle does not depend on an angle of direction.

An outer peripheral portion of a domain of the liquid crystal layer does not have a uniform alignment state since there is a variance in contact points of a rubbing cloth in the rubbing direction, particularly at the mask opening portions when the rubbing process is performed using a hard mask. By locating the outer peripheral portion of the domain within a non-display portion covered by a black matrix or the like, the display portion can have a uniform and good alignment state. Since the hard mask and the alignment film are adhered to each other, it is possible to perform the rubbing process with high precision on both sides of the mask opening portion in the rubbing direction.

By designing the hard mask used in the mask rubbing process to have opening portions which conform to the desired pixel size and pixel pitch, a plurality of domains can be formed without restraint in a pixel portion and multi-domain can be implemented.

In view of hardness and handling of the hard mask, it is preferable to perform a mask rubbing process by using a metal mask having a predetermined opening portion formed by an etching method or an electroforming method. A mask rubbing process is performed with the opening portion of the hard mask located at a pixel portion or sub-pixel portion. By repeating such a mask rubbing process a plurality of times with the positions and the rubbing direction changed, it becomes possible to form a plurality of domains.

The hard mask has to be thick to a certain degree in view of the hardness and handling of the hard mask, and precision of the rubbing regions. The study by the present inventors shows that a thickness in the range of 30 μm to 50 μm (inclusive) is preferable.

When the hard mask having such a thickness is used in the mask rubbing process, the area rubbed in the actual alignment film does not match the area of the mask opening portion in general, and becomes smaller than the area of the mask opening portion. It is recognized that there is a region which is not rubbed (a rubbing shade) depending on the thickness of the mask. Thus, it is preferable to set the size of the opening portion of the hard mask to be larger than the pixel size or the sub-pixel size to allow for a region which is not rubbed (a rubbing shade), due to the area of the rubbing region being smaller than that of the mask opening portion. This ensures that the domains of the liquid crystal layer locate in a display portion in the pixel portion or the sub-pixel portion.

It is preferable to perform a mask rubbing process by using a hard mask in which a cross section of the opening portion is not vertical (90°), but has a taper angle which is less than 90°. By performing the mask rubbing process using the metal mask having such an opening portion, a variance in points where the rubbing cloth touches the alignment film surface upon the mask rubbing process can be suppressed, and a rubbing process with a higher precision can be implemented. Particularly, it is preferable to perform the mask rubbing process using the hard mask having a taper angle of 60° to 70° (inclusive). By setting the taper angle within this range, the length of the rubbing shade can be reduced, and also the rubbing process can be performed using a hard mask having the opening portion with a lower variance in size, and less zigzag end surfaces (highly linear opening portion).

Next, an example in which a shock-absorbing section (hereinafter, simply referred to as a buffer section) is provided in the non-opened portion (mask portion) of the hard mask will be described. In this example, when the rubbing process is performed, the non-opened portion of the hard mask which contacts the rubbing cloth applies pressure to the substrate surface. The pressure can be buffered by the buffer section, and the alignment film surface covered by the non-opened portion can be prevented from receiving damage.

When the buffer section is formed in a part of the non-opened portion, there is an advantage that, by providing the buffer section in the non-display portion in the pixel of the liquid crystal display device, good display characteristics can be maintained even when the alignment film receives a certain damage via the buffer section since the damaged portion is located in the non-display portion.

In a fabrication method of the liquid crystal display device according to the present invention, it is preferable to provide the opening portion to be large with respect to domain in which alignment process is performed in the rubbing direction. When the rubbing process is performed through the opening portion, a portion which is not accurately processed with the rubbing process due to the thickness of the mask may occur near the end surfaces of the opening portions. Thus, by providing the opening portion to be larger than the domain, the entire domain can be processed with the appropriate rubbing process.

Further, in this example, it is preferable to provide the opening portion such that an upstream side is larger than a downstream side with respect to the domain. This is because the region which is not rubbed in the rubbing process is wider near the upstream side. By employing such a structure, a more accurate rubbing process can be performed.

The present invention can be applied to a wide viewing angle liquid crystal display mode in general, and is particularly effective in a mode formed of a plurality of domains which have different inclination directions of the liquid crystal molecules in the liquid crystal layer when a voltage having a certain threshold value or higher is applied (multi-domain liquid crystal display mode). The present invention can be applied to the multi-domain liquid crystal display mode, such as: multi-domain TN (Twisted Nematic) mode, multi-domain STN (Super Twisted Nematic) mode, multi-domain ECB (Electrically Controlled Birefringence) mode, multi-domain OCB (Optically Compensated Birefringence) mode, multi-domain IPS (In-Plane Switching) mode, multi-domain FLC (Ferroelectric Liquid Crystal) mode, multi-domain AFLC (Anti Ferroelectric Liquid Crystal) mode, and the like, which use a horizontal alignment film; multi-domain VA (Vertically Aligned) mode, and the like, which use a vertical alignment film; multi-domain HAN(Hybrid Aligned Nematic) mode, and the like, which use a horizontal alignment film for one substrate and a vertical alignment film for the other substrate; and the like.

The present invention allows a split alignment process, which is necessary in the vertical alignment liquid crystal display mode, by a simple and mechanical hard mask rubbing process without using a process such as ultraviolet irradiation or photolithography, which are not reliable, and can provide the liquid crystal display device having the rapid response property better than that of the conventional vertical alignment liquid crystal display mode particularly at low temperatures. This enables a liquid crystal display device which is good in both the viewing angle property and the response property, and can display at a high definition, to be produced.

The shock-absorbing section is provided in the non-opened portion (mask portion) of the hard mask. Thus, when the rubbing process is performed, the rubbing cloth jolts the hard mask and applies a pressure (stress) to the alignment film surface from the hard mask, but the pressure (stress) can be buffered by the shock-absorbing section to avoid damage of the alignment film surface covered by the non-opened portion of the hard mask in view of the alignment control power. This enables a liquid crystal display device which is good in both the viewing angle property and the response property, and can display at a higher definition to be produced.

Thus, the invention described herein makes possible the advantages of providing a reliable liquid crystal display device in which a rubbing process can be performed with a good dimension precision on both sides of a rubbing process region in a rubbing direction, and which is good in both a viewing angle property and a response property and can display at a high definition, a fabrication method thereof, and a hard mask used in the method.

These and other advantages of the present invention will become apparent to those skilled in the art upon reading and understanding the following detailed description with reference to the accompanying figures.

BRIEF DESCRIPTION OF THE DRAWINGS

FIG. 3A is a schematic plan view showing alignment states of the liquid crystal molecules in four domains of one pixel portion as show in FIGS. 1 and 2; and FIG. 3B is a plan view of a hard mask for performing a rubbing process on domain D2 shown in FIG. 3A.

FIGS. 4A to 4F are cross-sectional views showing a mask rubbing process for forming four alignment domains using a hard mask in the liquid crystal display device of FIG. 1.

FIG. 5A is a schematic cross-sectional view of a liquid crystal display device of Embodiment 2 showing a structure of one pixel when there is no voltage application; and FIG. 5B is a plan view of the liquid crystal display device of Embodiment 2 when viewed from a substrate normal direction for schematically showing the structure of one pixel when a voltage is applied.

FIG. 7A is a schematic cross-sectional view showing a structure of one pixel of a liquid crystal display device of Embodiment 3; FIG. 7B is a cross-sectional view showing a structure of one pixel of a liquid crystal display device of Embodiment 4.

FIG. 10A is a plan view showing a structure of a hard mask used in fabrication of the liquid crystal display device as Embodiment 6; and FIG. 10B is a cross-sectional view of the hard mask taken along line A-A'.

FIGS. 12A and 12B are schematic cross-sectional views showing a structure of a liquid crystal display device of Embodiment 7 of the present invention: FIG. 12A shows the liquid crystal display device when there is no voltage application; and FIG. 12B shows the liquid crystal molecules of the liquid crystal layer when a sufficiently high voltage having a predetermined threshold value or a higher value is applied.

FIG. 14A is a schematic cross sectional view; and FIG. 14B is a schematic plan view.

FIGS. 15A, 15B and 15C are diagrams for illustrating mask rubbing processes of Embodiment 7 of the present invention and the comparative example.

FIG. 16 is a diagram for illustrating a liquid crystal cell of Embodiment 7 of the present invention.

FIG. 17 is a diagram for illustrating a liquid crystal cell of the comparative example.

FIG. 18 is a schematic diagram for illustrating a dynamic response alignment state in the liquid crystal cell of Embodiment 7 of the present invention.

DESCRIPTION OF THE PREFERRED EMBODIMENTS

Hereinafter, Embodiments 1 to 8 of a liquid crystal display device according to the present invention will be described with reference to the drawings. Herein, for the sake of simplicity, a region of a liquid crystal cell corresponding to a "picture element portion" which is a smallest unit for a display is also referred to as a "pixel portion". If 1 pixel includes a plurality of regions, they are referred to as sub-pixel portions. For example, in an active matrix-type liquid crystal display device (for example, a liquid crystal display device using a TFT as a switching element), a pixel portion is defined by a pixel electrode and an opposing counter electrode. In a simple matrix-type liquid crystal display device, a pixel portion is defined by an intersection of a stripe-like column electrode (signal electrode) and a row electrode (scan electrode).

Embodiment 1

Figure 1:
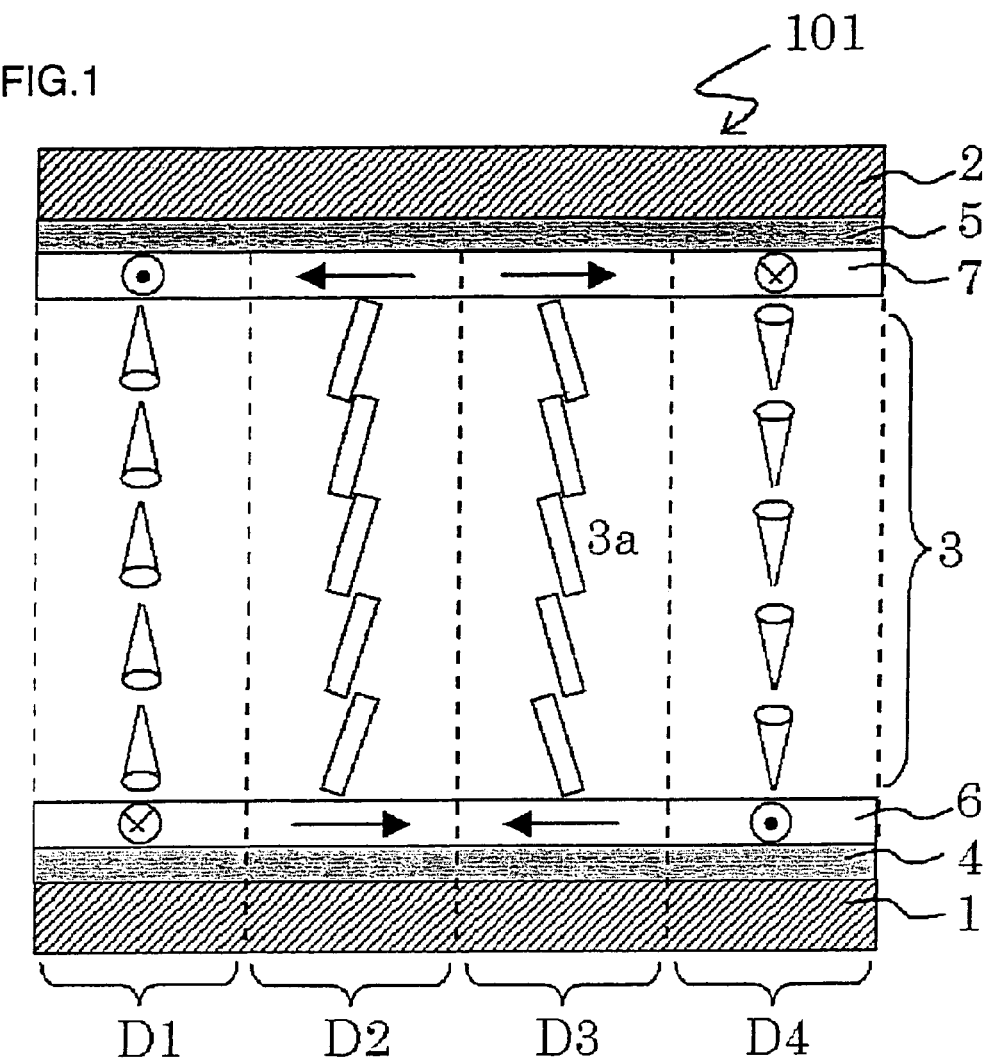
FIG. 1 is a schematic cross-sectional view showing a structure of one pixel in a liquid crystal display device according to Embodiment 1.

FIG. 1 is a schematic cross-sectional view showing a structure of one pixel in a liquid crystal display device according to Embodiment 1. FIG. 1 shows an example of a state of the liquid crystal display device with no voltage application.

As shown in FIG. 1, a liquid crystal display device 101 includes: a pair of opposing substrates, a first substrate 1 (for example, a TFT substrate) and a second substrate 2 (for example, a color filter substrate); and a liquid crystal layer 3 of a vertical-alignment type which is provided between the first substrate 1 and the second substrate 2.

On a surface portion of the first substrate 1 facing the liquid crystal layer 3, a transparent electrode 4 for applying a driving voltage to the liquid crystal layer 3 and a vertical alignment film 6 thereon are provided. Similarly, on a surface portion of the second substrate 2 facing the liquid crystal layer 3, a transparent electrode 5 for applying a driving voltage to the liquid crystal layer 3 and a vertical alignment film 7 thereon are provided.

The liquid crystal layer 3 of a vertical-alignment type is formed of, for example, a nematic liquid crystal material having a negative dielectric anisotropy. The liquid crystal layer 3 is sandwiched and held by the vertical alignment film 6 provided on the surface of the first substrate 1 facing the liquid crystal layer 3 and the vertical alignment film 7 provided on the surface of the second substrate 2 facing the liquid crystal layer 3.

Liquid crystal molecules $3a$ in the liquid crystal layer 3 are aligned vertically to surfaces of the vertical alignment films 6 and 7 when a driving voltage is not applied (no voltage application). Actually, the liquid crystal molecules $3a$ are aligned with a small inclination angle (tilt angle) of a little less than 10 to a few degrees with respect to the surfaces of the vertical alignment films 6 and 7. When a driving voltage is applied in a direction vertical to the surface of liquid crystal layer 3, liquid crystal molecules $3a$ incline toward a certain direction when a voltage of a threshold value or higher is applied, due to the preset tilt angle. When a sufficient driving voltage is applied, the liquid crystal molecules $3a$ of the liquid crystal layer 3 are aligned nearly parallel to the first substrate 1 and the second substrate 2. The angle by which the liquid crystal molecules $3a$ are inclined is defined by an alignment control direction (indicated by an arrow in the figure) of the surfaces of the vertical alignment film 6 provided on the first substrate 1 and the vertical alignment film 7 provided on the second substrate 2.

In the liquid crystal display device 101 of Embodiment 1, the alignment control direction of the surfaces of the vertical alignment films 6 and 7 is defined by performing a mask rubbing process only on desired portions by using a hard mask. The hard mask has an opening designed in accordance with the pixel size and the pixel pitch.

The hard mask as used herein does not mean a glass mask such as that used in a photolithography process (for example, a glass substrate with a metal film such as Cr patterned thereon). The hard mask as used herein means, for example, a mask formed of a metal plate, a plastic plate, a glass plate and the like having a thickness of a few tens of μm, and has an actual hole (opening) in a region in which a mask rubbing process is intended to be performed. There is no specific limitation in materials. However, it is preferable to use a material having a low coefficient of expansion and a high hardness. For example, in the case where a metal plate mask (metal mask) is used, materials such as stainless steel (SUS430 or SUS304), invar material, 42 alloy, nickel and cobalt alloy and the like are preferable.

The hard masks are fabricated by different methods depending on their materials. For example, most of the hard masks are fabricated by two different methods: an etching method; and an additive method. In the etching method, a resist is applied on a metal plate, and only a portion corresponding to the opening is exposed to an ultra violet ray, developed and etched to form an opening on a metal plate. In the additive method, a resist of a thickness is provided on an appropriate member with a portion to be an opening patterned, and metal is provided on a portion other than the opening which will be a mask portion.

In the liquid crystal display device 101 of Embodiment 1, the liquid crystal layer 3 includes a plurality of domains (for example, four domains in FIG. 1) in one pixel portion. The domains have alignment control directions different from each other by a mask rubbing process using a hard mask.

In FIG. 1, the four domains are indicated by D1, D2, D3 and D4, respectively. In domain D1, the first substrate 1 is processed with a rubbing process in a direction heading toward the plane of the paper of FIG. 1 from the font side to the back side. The second substrate 2 is processed with a rubbing process in a direction coming out from the plane of the paper of FIG. 1. In domain D2, the first substrate 1 is processed with a rubbing process from left to right of FIG. 1. The second substrate 2 is processed with a rubbing process from right to left of FIG. 1. In domain D3, the first substrate 1 is processed with a rubbing process from right to left of FIG. 1. The second substrate 2 is processed with a rubbing process from left to right of FIG. 1. In domain D4, the first substrate 1 is processed with a rubbing process in a direction coming out from the plane of the paper of FIG. 1. The second substrate 2 is processed with a rubbing process in a direction heading toward the plane of the paper of FIG. 1.

By performing a mask rubbing process using a hard mask in this way, the liquid crystal layer 3 can be divided into a plurality of domains (four domains in FIG. 1). In the domains, the directions of the tilt angles of the liquid crystal molecules 3a when there is no voltage application are controlled along the alignment control directions (rubbing directions), and they are different from each other.

As shown in FIG. 1, in domain D1, the liquid crystal molecules 3a are inclined toward the plane of the paper of FIG. 1 along the rubbing direction of the first substrate 1 and the second substrate 2. In domain D2, the liquid crystal molecules 3a are inclined from the left toward the right of FIG. 1 along the rubbing direction of the first substrate 1 and the second substrate 2. In domain D3, the liquid crystal molecules 3a are inclined from the right toward the left of FIG. 1 along the rubbing direction of the first substrate 1 and the second substrate 2. In domain D4, the liquid crystal molecules 3a are inclined toward the front of the paper of FIG. 1 along the rubbing direction of the first substrate 1 and the second substrate 2. Thus, it becomes possible to produce multi-domains for obtaining a liquid crystal display device having different directions of the liquid crystal molecules 3a inclined when a voltage of a threshold value or higher is applied in the domains, and having a wide viewing angle.

Figure 2:
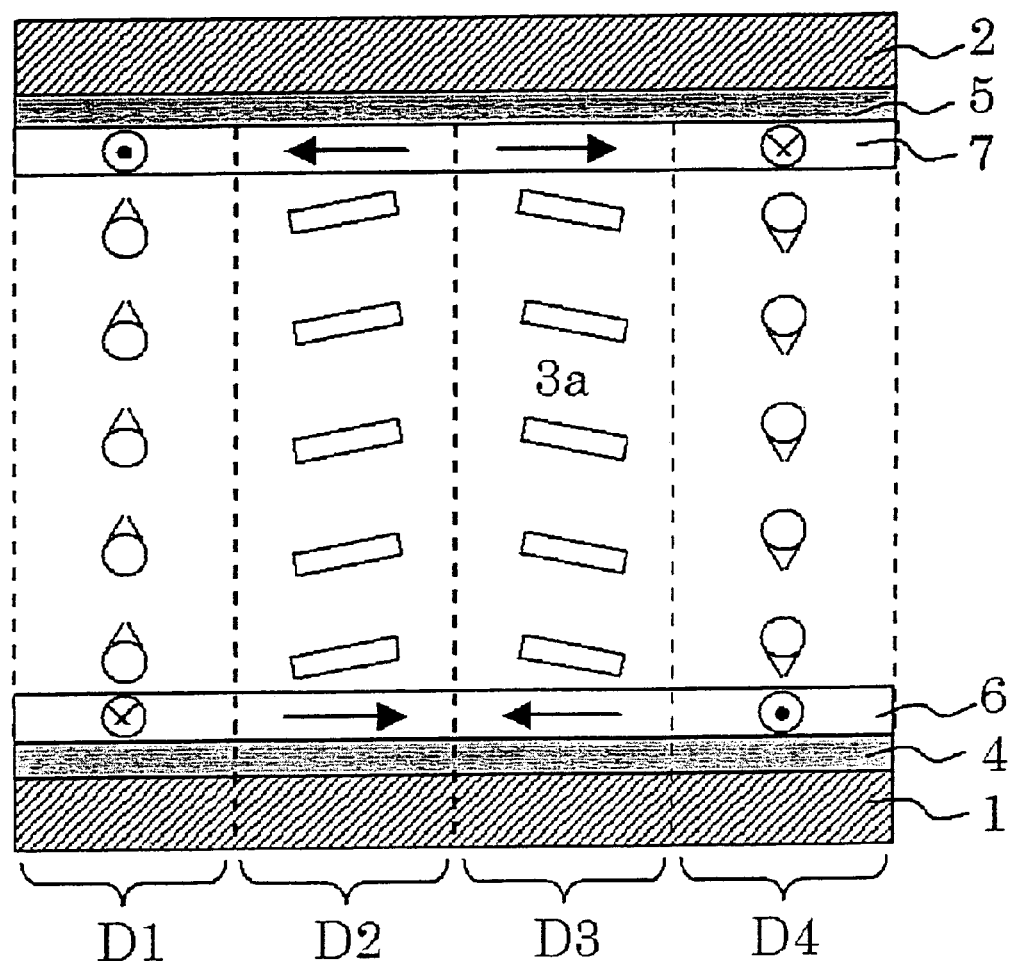
FIG. 2 is a schematic cross-sectional view showing a structure of one pixel in the liquid crystal display device of FIG. 1 when a voltage is applied.

FIG. 2 is a schematic cross-sectional view showing an exemplary alignment states of the liquid crystal molecules 3a in the liquid crystal layer 3 when a driving voltage of a threshold value or higher is applied in the liquid crystal display device 101 of FIG. 1.

In FIG. 2, the liquid crystal molecules 3a incline toward a certain direction when a driving voltage is applied. The directions are different for each of the domains D1 to D4, and are substantially parallel to the first substrate 1 and the second substrate 2. The multi-domains are thus implemented, and a liquid crystal display device with a wide viewing angle and a high definition can be obtained.

FIG. 3A is a schematic plan view showing alignment states of the liquid crystal molecules in four domains of one pixel portion as show in FIGS. 1 and 2. FIG. 3B is a plan view of a hard mask for performing a rubbing process on domain D2 shown in FIG. 3A. The positional relationship between FIGS. 1, 2 and 3A is that FIGS. 1 and 2 are cross-sectional views of one pixel portion shown in the plan view of FIG. 3A viewed from arrow L. The rubbing direction of the vertical alignment film 6 of the lower first substrate 1 is indicated by a broken line. The rubbing direction of the vertical alignment film 7 of the upper second substrate 2 is indicated by a solid line. These figures merely show the concept of the present application using a hard mask rubbing process. The specific size such as the size and the thickness of the pixels, the opening of the hard mask will be described below.

FIGS. 4A to 4F are cross-sectional views showing an exemplary fabrication method for fabricating four domains D1 to D4 in the liquid crystal display device 101 according to Embodiment 1. For the sake of simplicity, FIGS. 4A to 4F show only a fabrication process of the first substrate 1. However, the second substrate 2 can also be fabricated with a similar process as the first substrate 1.

Figure 4A:
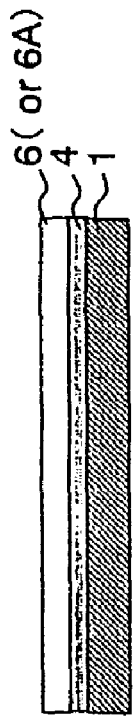

First, as shown in FIG. 4A, on the transparent electrode 4 of the first substrate 1, a vertical alignment film, for example, a polyimide vertical alignment film JALS-682 (available from JSR Corporation) is formed by a spin coat method to a film thickness of 500 angstrom. Thus, the alignment film layer 6 is formed.

Figure 4B:
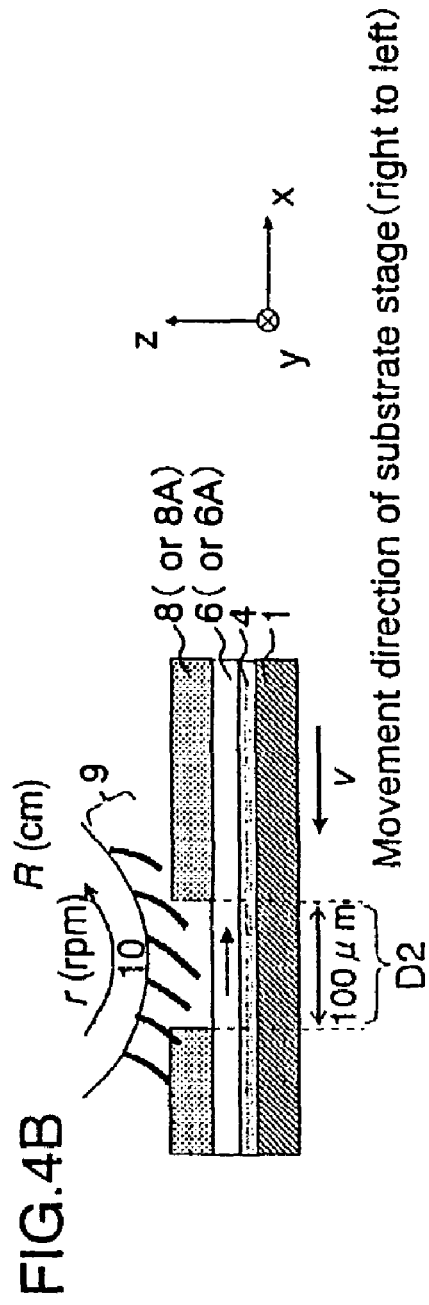

Next, as shown in FIG. 4B, a metal mask is used to perform a mask rubbing process. The metal mask is a hard mask 8 which is, for example, formed of stainless steel (SUS430) having a thickness of 50 μm, and has, for example, openings 8a of 100 μm (x direction)×200 μm (y direction) provided at intervals of 300 μm in the x direction and 300 μm in the y direction. In FIG. 4B, the x direction is a direction toward the right side in the plane of the paper, and the y direction is a direction heading toward the plane of the paper. As shown in FIG. 4B, the openings 8a of the metal mask 8 are aligned to the positions corresponding to the domain D2 and fixed. Then a rubbing roller 10 is used thereon, and a mask rubbing process is performed along a predetermined direction (the direction to the right in FIG. 4B). The rubbing roller 10 is surrounded by a rubbing cloth 9, which is for example, rayon cloth YA-19R (available from Yoshikawa Kagaku Kogyo Co. Ltd.). Rubbing conditions are, for example, the movement velocity of the first substrate 1 of 50 mm/sec, the radius of the roller 10 R of 7.5 cm, the rotation rate of the roller 10 of 500 rpm, and the degree of the debris pushed in d of 0.4 mm. As described above, first, only a portion corresponding to domain D2 is processed with the alignment control process in a predetermined direction (direction to the right). Other portions are covered with non-opened portions (mask portion) of the metal mask 8. Thus, they are not processed with the alignment control process.

Figure 4C:
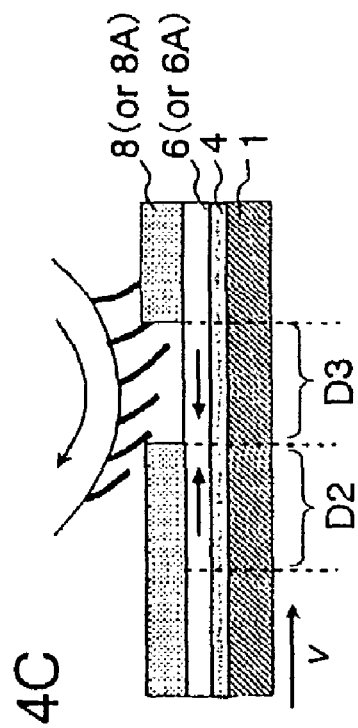

As shown in FIG. 4C, the metal mask 8 is shifted by only 100 μm to the right. The openings 8a of the metal mask 8 are aligned with the position corresponding to domain D3. Then, the mask rubbing process is performed in the direction toward the left by a similar procedure. In this way, only a portion corresponding to domain D3 is processed with the alignment control process in a predetermined direction (direction to the left).

As shown in FIG. 4D, the openings 8a of the metal mask 8 is aligned with the position corresponding to domain D1, and the mask rubbing process is performed in the direction heading toward the plane of the paper with a similar procedure. Thus, only the portion corresponding to domain D1 is processed with the alignment control process in the predetermined direction (direction heading toward the plane of the paper).

As shown in FIG. 4E, the openings 8a of the metal mask 8 is aligned with the position corresponding to domain D4, and the mask rubbing process is performed in a direction coming out of the plane of the paper with a similar process. Thus, only a portion corresponding to domain D4 is processed with the alignment control process in the predetermined direction (direction coming out from the plane of the paper).

After such a mask rubbing processes, as shown in FIG. 4F, the vertical alignment film 6 on the first substrate 1 are divided to have four alignment control directions.

The second substrate 2 which opposes the first substrate 1 is also divided to have four alignment control directions divided by the similar process. The first substrate 1 and the second substrate 2 are applied with spacer beads and attached to each other so as to have predetermined cell gaps, for example, cell gaps of 3.5 μm.

Then, a nematic liquid crystal material having a negative dielectric anisotropy, for example, n-type liquid crystal (available from Merck KGaA) MJ001025($\Delta n$=0.0916, $\Delta \epsilon$=−2.4, Tni=80° C.) is injected between the first substrate 1 and the second substrate 2 and enclosed at the condition of 60° C.

Further, the liquid crystal display device with the liquid crystal layer 3 injected is subjected to a re-alignment processing step. In this step, the liquid crystal display device is kept in an oven set to about 120° C. for approximately ten minutes and gradually cooled down to room temperature (about 25° C.) at a rate of 10° C./hours.

In the liquid crystal display device 101 of Embodiment 1 according to the present invention fabricated as such, the liquid crystal layer 3 is confirmed to be divided into four domains and aligned as shown in FIG. 1 when there is no voltage application. Further, the tilt angles in the domains are measured by a crystal rotation method. The tilt angles in all the domains are 88.5°.

It is confirmed that when a driving voltage of the threshold value or higher is applied to the liquid crystal display device 101 fabricated as such, the liquid crystal molecules 3a are aligned to incline along the alignment control direction defined by the mask rubbing process in the respective domains as shown in FIG. 2. It is also confirmed that when a sufficiently high driving voltage, for example, 7V is applied, the liquid crystal molecules 3a are aligned substantially parallel with the first substrate 1 and the second substrate 2. Furthermore, it is confirmed that the inclination directions of the liquid crystal molecules 3a in the respective domains are different from each other by 90°, and a wide viewing angle is implemented.

In the liquid crystal display device 101 as shown in FIG. 1, for forming four domains having different alignment control directions, as shown in FIGS. 4A to 4F, mask rubbing processes are required 8 times in total for two substrates: four times each for the first substrate 1 and the second substrate 2.

Now, a rapid response property of Embodiment 1 will be described. The liquid crystal molecules near the interface of the alignment film mask rubbing process are previously processed with the mask rubbing process, and they are aligned to uniformly incline with respect to the substrate surface from the beginning. The angle between the substrate surface and the alignment direction (tilt angle) is 88.5°. The tilt angle of 88.5° hardly contributes to the optical properties in the facing direction. However, it is a sufficient angle for uniformly inclining the liquid crystal modules. In the liquid crystal display device 101 of Embodiment 1, all the domains are processed with an entire surface rubbing process. At the moment when a voltage is applied, the inclination directions of the liquid crystal molecules across the entire surface within the domain are determined uniformly and the alignment changes uniformly. As a result, optical response waveforms rises quickly like those of the liquid crystal display devices 201 and 202 of Embodiment 3 shown in FIGS. 7A and 7B. This will be described in detail with reference to Embodiments 3 and 4 below by using a comparative example shown in FIG. 7C.

In Embodiment 1, mask rubbing processes are performed with in the position of the opening 8a of the metal mask 8, as a hard mask is sequentially shifted to align the opening 8a with a predetermined target rubbing position. However, the present invention is not limited to this. Metal masks 8 having the openings at different positions may be sequentially exchanged to align the opening 8a with predetermined target rubbing positions.

In Embodiment 1, the alignment films are vertical alignment films 6 and 7, which align the liquid crystal molecules 3a in the liquid crystal layer 3 substantially vertical when there is no voltage application. The domains in the vertical alignment films 6 and 7 (in this example, four domains) are respectively processed with a mask rubbing process from the opening 8a by using the metal mask 8 as a hard mask such that their alignment control directions are different from each other. However, instead of vertical alignment films 6 and 7, horizontal alignment films may be used and a horizontal alignment mask rubbing process may be performed. The effect of the present invention, which is to provide a liquid crystal display device which is good in both a viewing angle property and a response property, can also be achieved by using the horizontal alignment films as Embodiment 1. In the case where the horizontal alignment films are used, the cross-sectional view of one pixel where there is no voltage application is the view shown in FIG. 2. The cross-sectional view of one pixel when a predetermined voltage is applied (when being driven) is the view shown in FIG. 1. A material used in the horizontal alignment films is a polyimide alignment film AL3046 (available from JSR Corporation). This is formed by a spin coat method to have film thickness of 500 angstroms. The cell thickness is 4.5 μm. P-type (positive type) liquid crystal material ZLI-4792 ($\Delta n$=0.0988, $\Delta \epsilon$=5.2) (available from Merck KGaA) is used as the liquid crystal material for the liquid crystal layer 3. The tilt angle is five degree. Other conditions are the same as those in the case where the vertical alignment films 6 and 7 are used.

Embodiment 1 is not limited to the liquid crystal display device of the vertical-alignment type using the vertical alignment films, or the horizontal-alignment type using the horizontal alignment films. Embodiment 1 is also applicable to the liquid crystal display device of a hybrid type, which is a combination thereof. Further, Embodiment 1 is applicable to a liquid crystal display device of any mode, for example, a ferroelectric or antiferroelectric liquid crystal display mode, as long as it is a multi-domain liquid crystal display mode.

Moreover, the liquid crystal display device according to the present invention is not limited to the structure of Embodiment 1 as shown in FIGS. 1 and 2. In order to decrease the number of the mask rubbing processes, a structure such as that of a liquid crystal display device 102 shown in FIG. 5 below may be employed. Such a structure will be described in detail below as Embodiment 2.

Embodiment 2

In the above-described Embodiment 1, the present invention is applied to the case where the alignment of the liquid crystal layer 3 in four domains is substantially horizontal with respect to the substrate surface and to the case where the alignment of the liquid crystal layer 3 in four domains is substantially vertical with respect to the substrate surface when a voltage having a predetermined threshold value or a higher is applied. In Embodiment 2, the present invention is applied to the case where the alignment of the liquid crystal layer 3 in four domains is a twist alignment when a voltage having a predetermined threshold value or a higher is applied. In this case, the number of the mask rubbing processes can be decreased.

FIG. 5A is a schematic cross-sectional view of a liquid crystal display device of Embodiment 2 showing one pixel when there is no voltage application. FIG. 5B is a plan view showing a liquid crystal display device according to Embodiment 2 when viewed from a substrate normal direction for schematically showing the structure of one pixel when a voltage is applied.

FIG. 5A shows the liquid crystal display device 102 having the first substrate 1. Domains D1 and D2 are processed with a rubbing process from left to right in FIG. 1. In domains D3 and D4, the rubbing process is performed from right to left in FIG. 1.

In the second substrate 2, domains D1 and D4 are processed with a rubbing process performed in a direction coming out from the paper of FIG. 1, and domains D2 and D3 are processed with a rubbing process in a direction heading toward the paper of FIG. 1.

In such a case, mask rubbing processes performed on the vertical alignment films 6 and 7 of the first substrate 1 and the second substrate 2 may be twice as much for one substrate by using the hard mask, and four times in total.

In this way, by performing a mask rubbing process using a hard mask, the liquid crystal layer 3 can be divided into a plurality of (four in FIG. 5) domains having the directions of the tilt angles of the liquid crystal molecules 3a, when there is no voltage application, controlled along the alignment control direction (rubbing direction) and are different from each other.

As shown FIG. 5A, in domain D1, the liquid crystal molecules 3a are inclined from left to right of FIG. 5A along the rubbing direction of the first substrate 1 on the side of the first substrate 1, and are inclined in the direction heading toward the paper of FIG. 5A along the rubbing direction of the second substrate 2 on the side of the second substrate 2. In domain D2, the liquid crystal molecules 3a are inclined from left to right of FIG. 5A along the rubbing direction of the first substrate 1 on the side of the first substrate 1, and are inclined in the direction coming out from the paper of FIG. 5A along the rubbing direction of the second substrate 2 on the side of the second substrate 2. In domain D3, the liquid crystal molecules 3a are inclined from right to left of FIG. 5A along the rubbing direction of the first substrate 1 on the side of the first substrate 1, and are inclined in the direction coming out from the paper of FIG. 5A along the rubbing direction of the second substrate 2 on the side of the second substrate 2. In domain D4, the liquid crystal molecules 3a are inclined from right to left of FIG. 5A along the rubbing direction of the first substrate 1 on the side of the first substrate 1, and are inclined in the direction heading toward the paper of FIG. 5A along the rubbing direction of the second substrate 2 on the side of the second substrate 2.

Thus, it becomes possible to provide multiple domains in the liquid crystal display device having the inclination directions of the liquid crystal molecules 3a in the domains different from each other when there is no voltage application and having a wide viewing angle.

FIG. 5B is a schematic diagram showing an alignment state of the liquid crystal molecules 3a when, for example, a voltage of 7V is applied to the liquid crystal layer 3 in the liquid crystal display device 102 shown in FIG. 5A from a direction normal to the substrate.

As shown in FIG. 5B, multiple domains are provided to have inclination alignment such that the liquid crystal molecules 3a around the middle of the liquid crystal layer 3 are different from each other by 90° among the domains (twist alignment). As such, multi-domain can be implemented, and the liquid crystal display device having a wide viewing angle and a high definition can be obtained.

The liquid crystal display device 101 of Embodiment 1 shown in FIG. 1 and the liquid crystal display device 102 of Embodiment 2 shown in FIG. 5 have the following difference in the alignment states of the liquid crystal layer 3. When a sufficiently high voltage (for example, 7V) is applied, the liquid crystal molecules 3a are in parallel alignment state in FIG. 2, while the liquid crystal molecules 3a are in the twist alignment in which twists are concentrated around the interface between the first substrate 1 and the second substrate 2 in FIG. 5. However, as the result of a detailed examination of the viewing angle properties by the present inventors, no difference was found between them. Their viewing angle properties are substantially the same.

Further, the present inventors used a stainless steel metal mask 11 as the above-mentioned hard mask 8 and examined the relationship between the openings/non-openings thereof and regions which have been processed with the mask rubbing and their alignment control directions are provided on the alignment film surface, in detail. This is shown in FIGS. 6A to 6C.

First, the metal mask 11 will be described.

Figure 6A:
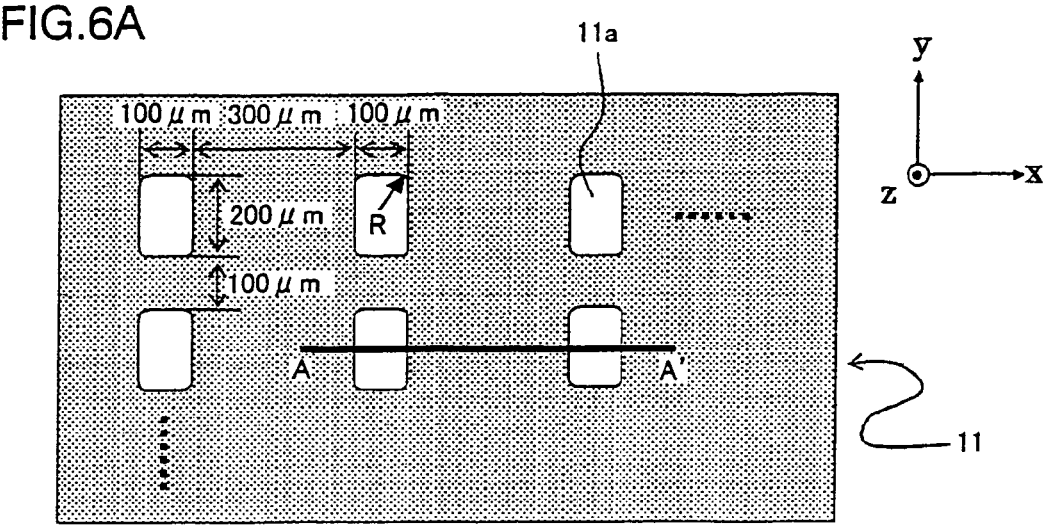
FIG. 6A is a plan view of a metal mask used in fabrication of the liquid crystal display device of Embodiment 2.
Figure 6B:
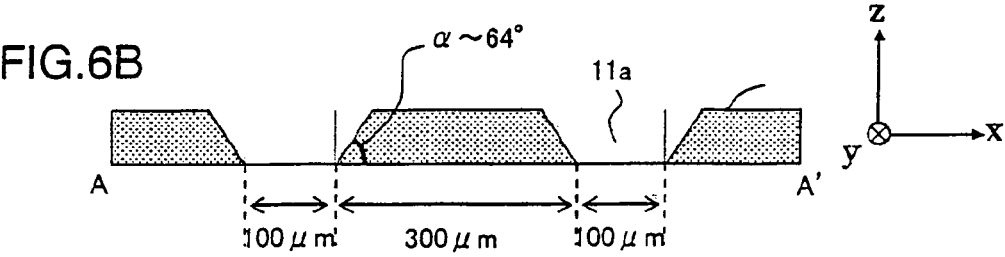
FIG. 6B is a cross-sectional view along line A-A' shown in FIG. 6A.
Figure 6C:
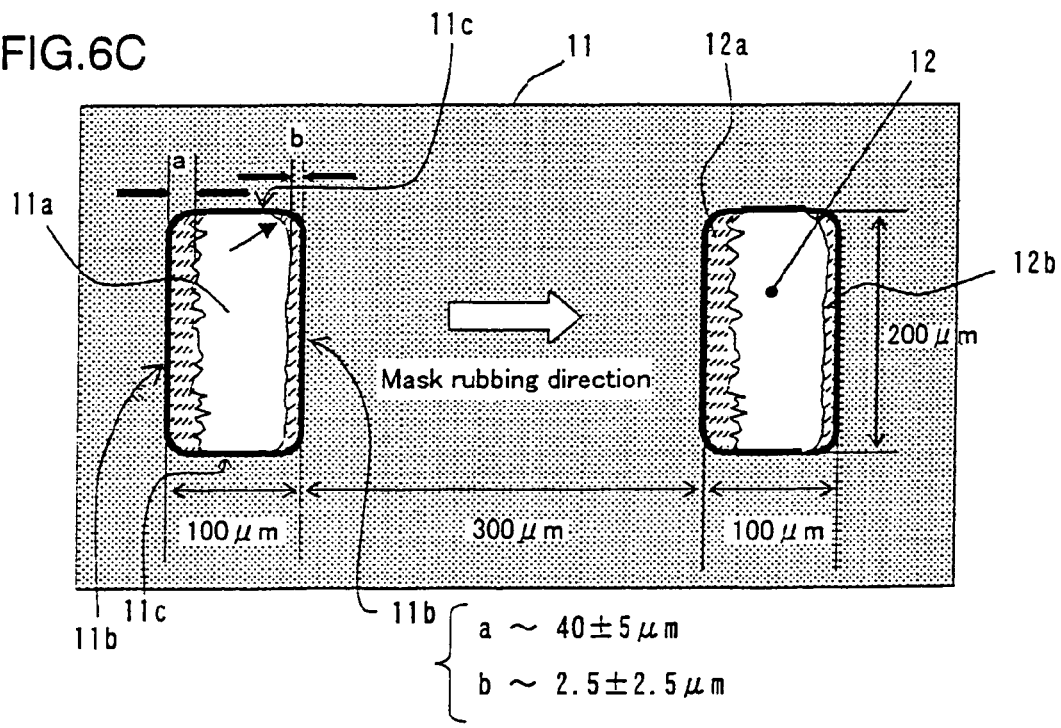
FIG. 6C is a plan view showing the mask rubbing process using the hard mask.

FIG. 6A is a plan view of the metal mask 11 used in Embodiment 2 viewed from the normal direction. FIG. 6B is a cross-sectional view along line A-A' shown in FIG. 6A. The metal mask 11 includes openings 11a of 100 μM×200 μm at the intervals of 300 μm in the x direction and 100 μm in they direction. The cross section of the metal mask 11 is examined in detail. It is found that the sides of the cross section of the metal mask 11 are not vertical, but are inclined at a predetermined angle (taper angle) α. The angle α is, for example, about 64°. Further, the corners of the openings of the metal mask 11 on the plane are not square angles, but rounded. This characteristic is specific to the mask fabricated by the etching method. The corner R shown in FIG. 6A (the radiant of the circle when the corners are inserted therein) is about 30 μm in this mask.

Next, for further examining the relationship between the size of the region having the alignment control direction effectively defined by mask rubbing in the liquid crystal layer 3 (region 12 of FIG. 6C) and the size of the opening 11a of the metal mask 11, mask rubbing process is performed using the metal mask 11 for only one domain.

In the liquid crystal display devices 101 and 102 according to the present invention, n-type liquid crystal material is sandwiched between the vertical alignment films. The present inventors conducted a detailed analysis and examined a mask rubbing region after performing a mask rubbing process on the vertical alignment films and then applying a voltage of about 7V. It is found that the size of the regions subjected to the mask rubbing process is the same as that when the mask rubbing process is performed on the horizontal alignment films. Compared to the case where the vertical alignment films are used, a procedure of applying a voltage to a liquid crystal layer can be omitted when the horizontal alignment films are used. Thus, as long as the size of the region subjected to the mask rubbing process is concerned, the horizontal alignment films are used for experiments in Embodiment 2. In the following description, only the size of the region subjected to a mask rubbing process, horizontal alignment films are used for experiments.

For example, a horizontal alignment film AL3046 (available from JSR Corporation) is applied to the first substrate 1 and the second substrate 2. The metal mask 11 is adhered and fixed onto only the first substrate 1, and a mask rubbing process is performed along the +x direction shown in FIG. 6A. Across the entire surface of the second substrate 2, a rubbing process is performed along the +y direction shown in FIG. 6A without using the metal mask 11. The substrates 1 and 2 are bonded with a liquid crystal material inserted therebetween.

A polarizer and an analyzer are arranged in crossed nicols. Then, a liquid crystal cell is fixed between the polarizer and the analyzer such that a polarizing axis of the polarizer matches the +x direction, which is the mask rubbing direction, for performing a microscope observation. The liquid crystal molecules 3a of the liquid crystal layer 3 are in twist alignment (TN) of about 90° and light is transmitted only in a region in which the mask rubbing process is actually performed to define the alignment control direction of the liquid crystal molecules 3a in the liquid crystal layer 3. Thus, it is possible to measure the region in which the alignment control direction is defined.

FIG. 6C is a schematic diagram of the metal mask 11 which is adhered onto the alignment films 6 and 7 and subjected to a rubbing process when viewed from a direction normal to the substrate.

In FIG. 6C, region 12 is a region which the alignment control direction of the liquid crystal molecules 3a of the liquid crystal layer 3 is defined by the mask rubbing process. A black bold line indicates end portions 11b and 11c of the opening portion 11a of the metal mask 11.

As shown in FIG. 6C, in general, the size of the region 12 which is actually subjected to the mask rubbing process is smaller than the size of the opening 11a of the metal mask 11 with respect to the rubbing direction. More specifically, the metal mask end portions 11c along a direction parallel to the mask rubbing direction (in FIG. 6C, upper and lower sides of the opening) substantially overlap the end portions of the mask rubbing region 12 which is subjected by the mask rubbing process, while the metal mask portions 11b along a direction perpendicular to the mask rubbing direction (in FIG. 6C, the right and left sides along the vertical direction) do not overlap the end portions of the mask rubbing region 12.

This is because the metal mask 11 has a limited thickness (for example, 50 μm) and a region which is not processed with a mask rubbing process (hereinafter, referred to as a rubbing shaded region) is generated. Hereinafter, a shade which is produced at the near side along the rubbing direction when the mask rubbing process is performed is referred to as a rubbing upstream shade 12a (or an upstream shade), a shade which is produced at the further side along the rubbing direction is referred to as a rubbing downstream shade 12b (or a downstream shade).

In FIG. 6C, the length of the upstream shade 12a is indicated by a, and the length of the downstream shade 12b is indicated by b. Since the opening portion 11a of the metal mask 11 have corners R, the mask rubbing region is not linear but rounded around the corners of the mask opening portion 11a. This is not considered when measuring the rubbing shades.

In the rubbing upstream portion, contact points where debris of the rubbing cloth enters the opening portion 11a vary compared to the downstream portion. The end portion of the mask rubbing region 12 is not linear but zigzag. On the other hand, in the rubbing downstream portion the debris of the rubbing cloth goes out from the opening portion 11a. The end surface is more linear and less zigzag compared to the upstream portion. Herein, for measuring (the length) and quantifying the mask rubbing region 12, the number of the rubbing points and the cells are increased to measure midpoints of zigzags in detail. The results are: the length of the upstream shade, a=40±5 μm; and the length of the downstream shade, b=2.5±2.5 μm.

As described above, the metal mask opening portion 11a and the mask rubbing region 12 do not match each other. The length of the mask rubbing region 12 with respect to the rubbing direction is shorter than the length of the metal mask opening portion 11a by the amount which depends on the thickness of the metal mask. Therefore, when the liquid crystal display device is actually produced, it is necessary to perform a mask rubbing after the positioning is performed using a hard mask which has a larger area compared to that of the domain size (a pixel or sub-pixel) in each of the pixels.

Further, in the end portions of the mask rubbing region 12, particularly, the end portions perpendicular to the mask rubbing directions, the contact points and the departing points of the rubbing cloth vary. Thus, end portions have zigzag shapes having a predetermined width. When the liquid crystal display device is actually produced, if such a zigzag end portion is seen, it deteriorates the display definition. Thus, it is necessary to locate outer peripheral portions of the domains in a non-display portion covered by a black matrix, source lines, gate lines, supplementary volume lines, and the like, so as not to affect the display. This will be described in detail below with reference to Embodiments 3 and 4.

Embodiments 3 and 4

With reference to Embodiments 3 and 4, the case where zigzag end portions are generated along the rubbing direction of the mask rubbing region 12 for display and a black matrix or a variety of lines are used for covering the zigzag end portions.

FIG. 7A is a cross-sectional view showing the structure of one pixel of the liquid crystal display device according to Embodiment 3. FIG. 7B is across-sectional view showing the structure of one pixel of the liquid crystal display device according to Embodiment 4.

In FIGS. 7A and 7B, directions of the arrows are mask rubbing directions along which a rubbing process is performed using a metal mask. The liquid crystal display device 201 of Embodiment 3 includes domains D1 to D4 which have the size of 25 μm×100 μm. The liquid crystal display device 202 of Embodiment 4 includes domains D1 and D2 which have the size of 50 μm×100 μm.

The mask rubbing process after the application of the vertical alignment film is performed as described above with reference to FIGS. 4A to 4F. In the liquid crystal display device 201 of FIG. 7A, the mask rubbing process is performed similarly to the liquid crystal display device 101 according to Embodiment 1 shown in FIG. 1. Specifically, in domain D1, the first substrate 1 is processed by a rubbing process in a direction heading into the plane of the paper of FIG. 7A, and the second substrate 2 is processed by a rubbing process in a direction coming out from the plane of the paper of FIG. 7A. In domain D2, the first substrate 1 is processed by a rubbing process in a direction from the left to the right of FIG. 7A, the second substrate 2 is processed with the rubbing process in the direction from the right to the left of FIG. 7A. In domain D3, the first substrate 1 is processed by a rubbing process in a direction from right to left of FIG. 7A, the second substrate 2 is processed by a rubbing process in a direction from left to right of FIG. 7A. In domain D4, the first substrate 1 is processed by a rubbing process in the direction coming out from the plane of the paper of FIG. 7A, and the second substrate 2 is processed by a rubbing process in a direction heading to the plane of the paper of FIG. 7A.

Thus, in domain D1, the liquid crystal molecules 3a are inclined in the direction heading toward the plane of the paper of FIG. 7A along the rubbing directions of the first substrate 1 and the second substrate 2. In domain D2, the liquid crystal molecules 3a are inclined in the direction from left to right of FIG. 7A along the rubbing directions of the first substrate 1 and the second substrate 2. In domain D3, the liquid crystal molecules 3a are inclined in the direction from right to left of FIG. 7A along the rubbing directions of the first substrate 1 and the second substrate 2. In domain D4, the liquid crystal molecules 3a are inclined in the direction coming out from the plane of FIG. 7A along the rubbing directions of first substrate 1 and the second substrate 2. When a voltage having a certain threshold value or higher is applied, the liquid crystal molecules 3a are inclined in different directions in different domains. Thus, it becomes possible to implement multi-domains of the liquid crystal display device in order to achieve a wide viewing angle.

On the other hand, as shown in FIG. 7B showing the liquid crystal display device 202 of Embodiment 4, in domain D1, the first substrate 1 is processed by a rubbing process in a direction from left to right of FIG. 7B, and the second substrate 2 is processed by the rubbing process in a direction from right to left of FIG. 7B. In domain D2, the first substrate 1 is processed by a rubbing process in a direction from right to left of FIG. 7B, and the second substrate 2 is processed by a rubbing process in a direction from left to right of FIG. 7B.

Thus, in domain D1, the liquid crystal molecules 3a are inclined in the direction from left to right of FIG. 7A along the rubbing directions of the first substrate 1 and the second substrate 2. In domain D2, the liquid crystal molecules 3a are inclined in the direction from right to left of FIG. 7A along the rubbing directions of the first substrate 1 and the second substrate 2. When a voltage having a certain threshold value or a higher value is applied, the liquid crystal molecules 3a are inclined in different directions in different domains. Thus, it becomes possible to implement multi-domains of the liquid crystal display device in order to achieve a wide viewing angle.

The above-mentioned n-type liquid crystal material (for example, n-type liquid crystal material MJ001025 available from Merck KGaA) is injected into a liquid crystal cell (cell thickness 3.5 μm). Then, the tilt angle was measured by a crystal rotation method. All the domains in both the liquid crystal display devices 201 and 202 are 88.5°.

When there is no voltage application, the liquid crystal molecules 3a are inclined along the alignment control directions defined by the mask rubbing processes for the first substrate 1 and the second substrate 2 in the respective domains. Every domain has an inclination direction (alignment control direction) different from those of other domains.

In the liquid crystal display devices 201 and 202 shown in FIG. 7A and FIG. 7B, the second substrate 2 includes light blocking portions 21. The light blocking portions 21 are formed of a resin BM into a stripe shape having a width of 10 μm and provided such that the borders between the domains are the center lines. As described above, when the mask rubbing process is performed using a metal mask, the contact points of the rubbing cloth in the rubbing upstream portions and the downstream portions vary within +5 μm from the average contact point. Thus, by providing light blocking portions 21 of 10 μm width, a portion in which the contact points may vary (outer peripheral portions of the domains) can be provided in a non-display portion so as to avoid an effect on the display characteristic. The light blocking portions may be provided on the first substrate 1.

The rapid response property of Embodiment 1 is described above. Now, the rapid response property of Embodiments 3 and 4 will be further described in detail using a comparative example shown in FIG. 7C.

Figure 7C:
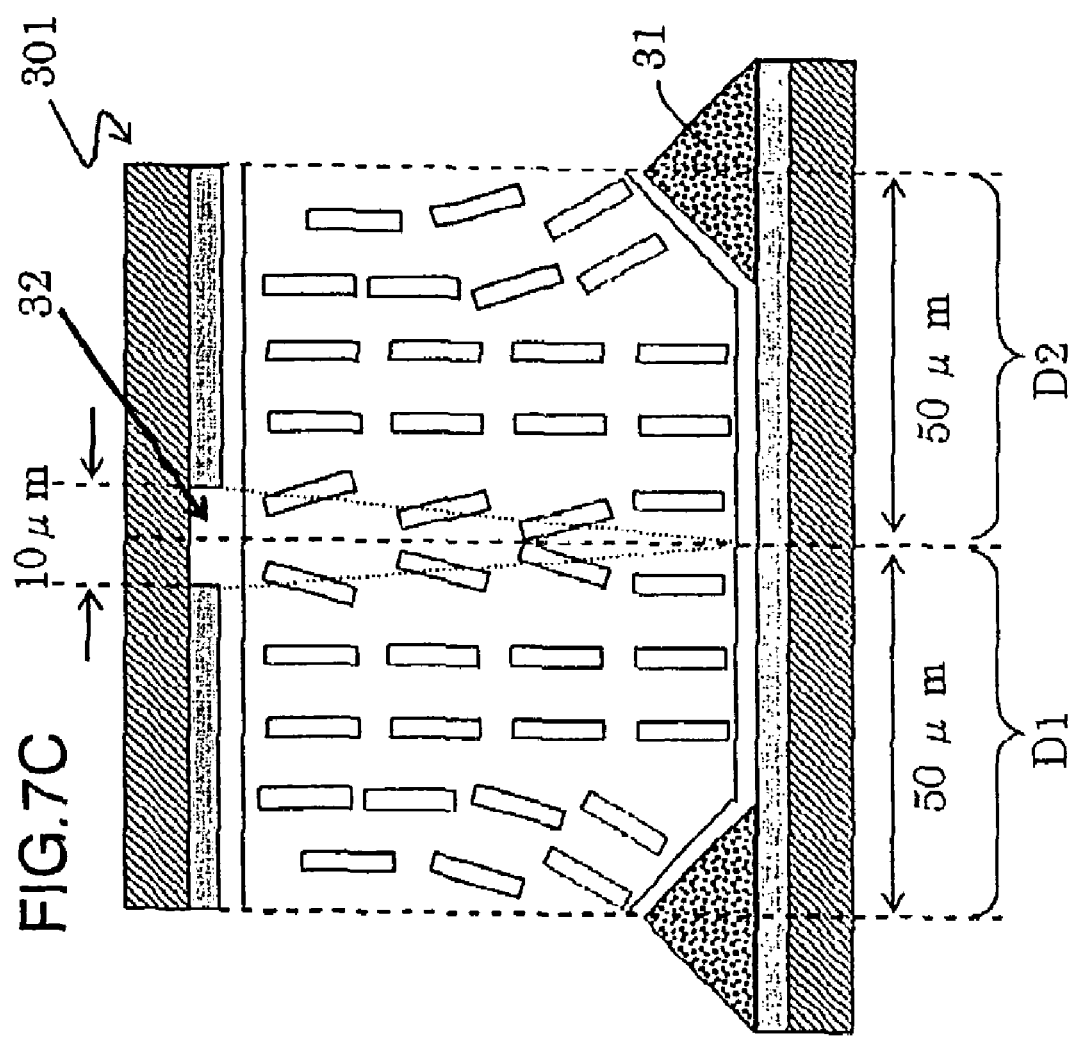
FIG. 7C is a cross-sectional view showing a structure of one pixel of a liquid crystal display device of a comparative example.

FIG. 7C is a cross-sectional view showing the structure of one pixel of the liquid crystal display device of the comparative example.

As shown in FIG. 7C, the alignment film of the comparative example, in a liquid crystal display device 301, is not processed with a rubbing process like the vertical alignment films 6 and 7. On the first substrate 1 side, tapered protrusions 31 are provided in the outer peripheral portions of the pixel portion. At an electrode 5 on the second substrate 2 side, a slit is provided at the center of the pixel portion. The protrusions 31 and the slit 32 cause the liquid crystal molecules 3a to incline in the outer periphery portions of domains D1 and D2. Thus, the inclination directions of the liquid crystal molecules 3a in the domains when a voltage is applied are defined. The liquid crystal display device 301 is substantially equivalent to Multi-domain Vertical Alignment mode (MVA mode), which is a conventional vertical alignment liquid crystal display mode.

In the liquid crystal display device 301 of the comparative example, the protrusion 31 are produced by patterning a photosensitive resin so as to be in a triangle shape having a height of about 1.5 μm and a base length of about 10 μm. The width of the slit 32 is 10 μm. The cell thickness is 3.5 μm, similar to those of the liquid crystal display devices 201 and 202 of the present embodiments.

The active response waveforms (response properties) of the liquid crystal display devices 201 and 202 of Embodiments 3 and 4 and the liquid crystal display device 301 of the comparative example are measured.

Figure 8A:
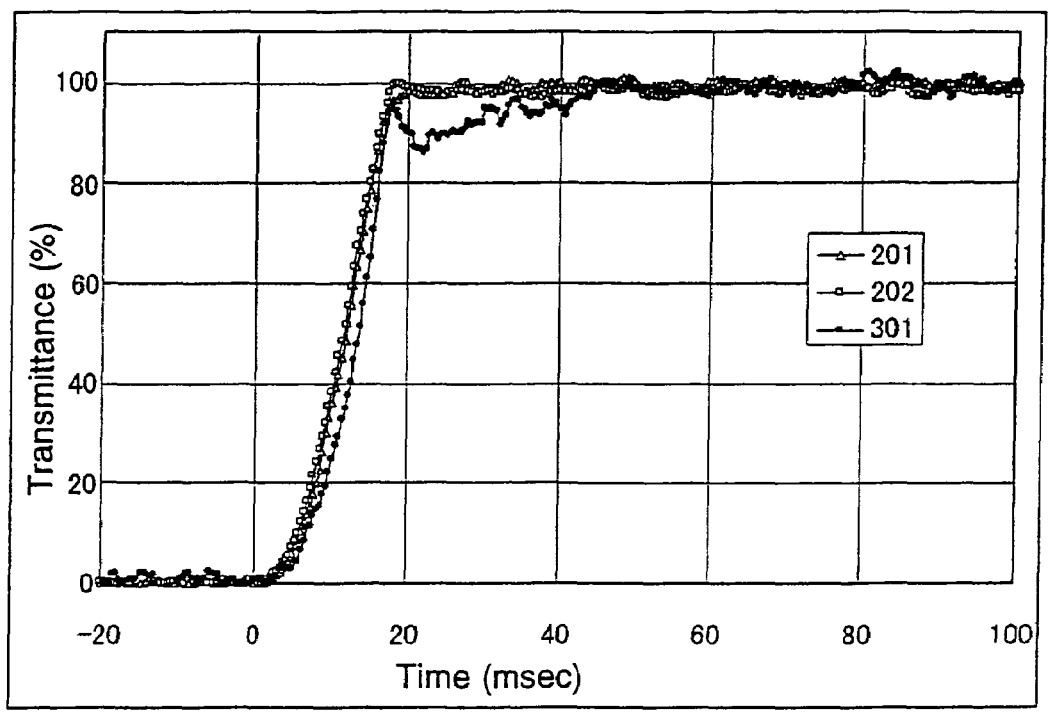
FIG. 8A is a graph showing measurement results of optical response waveforms of the liquid crystal display devices of Embodiments 3 and 4 and the comparative example at 40° C.
Figure 8B:
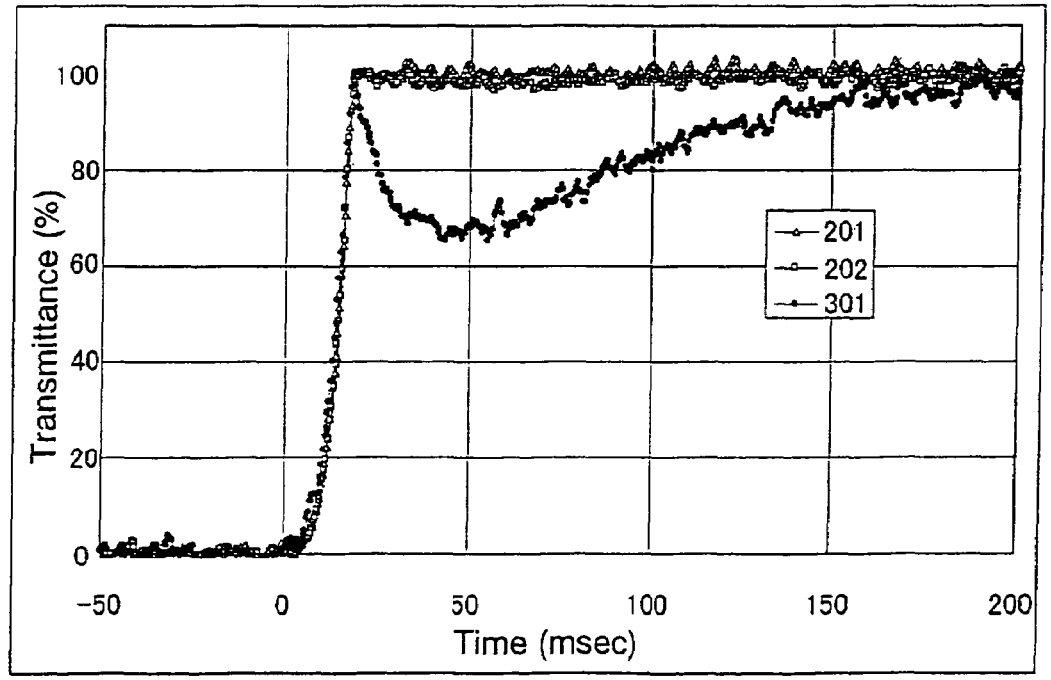
FIG. 8B is a graph showing measurement results of optical response waveforms at 5° C.

A polarizer and an analyzer are arranged in crossed nicols under a polarization microscope. Meanwhile, the liquid crystal display device is fixed such that the mask rubbing direction forms an angle of 45° with a polarization axis. A rectangular pulse of 1 kHz is applied to the liquid crystal display devices 201, 202 and 301 at a black display voltage 1.5V, and white display voltage 6.2V. The response output waveforms from the black display voltage to the white display voltage are detected by a photomultiplier (photomultiplier tube). The temperature of the liquid crystal display devices are controlled by mettler (METTLER FP90). The response waveforms are measured at 40° C. and 5° C. The measurement result at 40° C. is shown in FIG. 8A. The measurement result at 5° C. is shown in FIG. 8B. In FIGS. 8A and 8B, blank triangles indicate the results of the liquid crystal display device 201, blank squares indicate the results of the liquid crystal display device 202, and solid circles indicate the results of the liquid crystal display device 301. In FIGS. 8A and 8B, the black display voltage is applied at time T=0.

As shown in FIGS. 8A and 8B, the response waveforms of the liquid crystal display devices 201 and 202 of Embodiments 3 and 4 rapidly rise at both temperatures. On the other hand, the response waveform of the liquid crystal display device 301 of the comparative example shows a double response characteristic. It rises once, and then the transmittance reduces and rises again. The double response characteristic is more significant at a low temperature area of 5° C. than in the area of 40° C. When there is such a double response characteristic, defocus in a display is observed by human eyes to such a degree higher than which is expected from the response speed. Thus, the display definition is remarkably deteriorated. Particularly, when a still image displaying a face of a human is scrolled in a horizontal direction, the liquid crystal display device 301 of the comparative example cannot normally display an image since the image leaves traces. On the other hand, in the liquid crystal display devices 201 and 202 of Embodiments 3 and 4, an image rarely leaves traces. Even when the display is scrolled in the low-temperature atmosphere, it is possible to clearly recognize a face of a human.

The reason for this can be considered as follows.

The liquid crystal display devices 201 and 202 of Embodiments 3 and 4 are previously subjected to the alignment process by the mask rubbing process. The liquid crystal molecules near the alignment film interface are not vertical to the substrate surface (90°), but slightly inclined. The angle formed by the substrate surface and the alignment direction (tilt angle) is 88.5°. The tilt angle of 88.5° does not substantially contribute to the optical property viewed from the front, but is sufficient for uniformly inclining the liquid crystal molecules when a voltage is applied. In the liquid crystal display devices 201 and 202 of Embodiments 3 and 4, all the domains are processed with the entire surface rubbing process. At the instant of voltage application, the inclination direction of the liquid crystal molecules is defined across the entire surface of the domains. As a result, the optical response waveforms are the rapid rising waveforms as shown in FIGS. 8A and 8B.

On the other hand, in the liquid crystal display device 301 of the comparative example, the alignment film surface is not processed with an alignment process such as a rubbing process. The tilt angle of the liquid crystal molecules is vertical with respect to the interface. However, the liquid crystal molecules incline above the protrusions 31 due to the shape of the protrusions. Under the electrode slit 32, an electric field exerts in an oblique direction when a voltage is applied, and the inclination direction of the liquid crystal molecules are defined. Thus, in the liquid crystal display device 301 of the comparative example, at the instant of voltage application, first, the liquid crystal molecules where the protrusions 31 and the slit 32 are provided respond at a high-speed. Then, the liquid crystal molecules in the domains are affected from both sides and are sequentially aligned by a domino effect. As a result, in the liquid crystal display device 301 of the comparative example, there is a double optical response, which is to become bright immediately after voltage application, then to become dark, and then to become bright again.

It is possible to improve the double response characteristic of the liquid crystal display device 301 of the comparative example to a certain degree by altering the height or width the protrusions 31, the intervals therebetween, the width of the electrode slit 32, the intervals therebetween, and the like for optimization. However, as long as there is a region which is not processed with an alignment process, it is impossible to completely eliminate the double response characteristic. The characteristic can be improved at the expense of the aperture rate, and thus the transmittance and the luminance will deteriorate.

As a method for giving a tilt angle across the entire surface of the domains, or a method for performing an alignment process, the following methods may be considered as examples: an photo alignment method using an photo alignment film material having functional groups which only respond to an ultraviolet ray having a certain wavelength and polarization direction; and a method for performing a mask rubbing process using a mask produced by applying a photosensitive resin such as a photoresist to a normal alignment film material and patterning with a photolithography process.

However, the above methods have the following problems. The photo alignment films are poor in reliability and retention characteristic. Photo alignment films have been studied in detail, but there is no report of using photo alignment films on a mass-production basis. The mask rubbing method using a mask produced by a photolithography process requires a chemical process such as development/removal process of a resist. This may cause damage to the alignment film. The present inventors have diligently studied the mask rubbing process using a mask produced by a photolithography process. However, it is difficult to achieve such a mask produced by a photolithography process and a desirable tilt angle in the respective domains. As a result, a desired high-speed response characteristic cannot be obtained.

Based on the above-described points, the present inventors have reached the conclusion that the best method to address the double response characteristic of the multi-domain vertical alignment liquid crystal display mode is to directly performing the alignment process in the respective domains by a mask rubbing process using a hard mask such as a metal mask having an opening portion in accordance with a pixel size and a pixel pitch.

In FIG. 7A, one pixel portion is divided into four in the width direction, while in FIG. 7B, one pixel portion is divided into two in the width direction. However, in FIG. 7B, the one pixel portion may be further divided into two in a direction heading toward the plane of the paper, or may not be divided into two.

Next, an example of the quartered domains having a "squared plus" shape when viewed from above, which is obtained by further dividing the halved domain into two in a direction heading toward the plane of the paper, in which the alignment is a twist alignment, will be described with reference Embodiment 5 below.

Embodiment 5

With reference to Embodiment 5, an example of a "squared plus"-shape quartered domain, in which the alignment state of the liquid crystal layer 3 of the quartered domain will be a twist alignment when a voltage of a predetermined threshold value or higher is applied.

Figure 9:
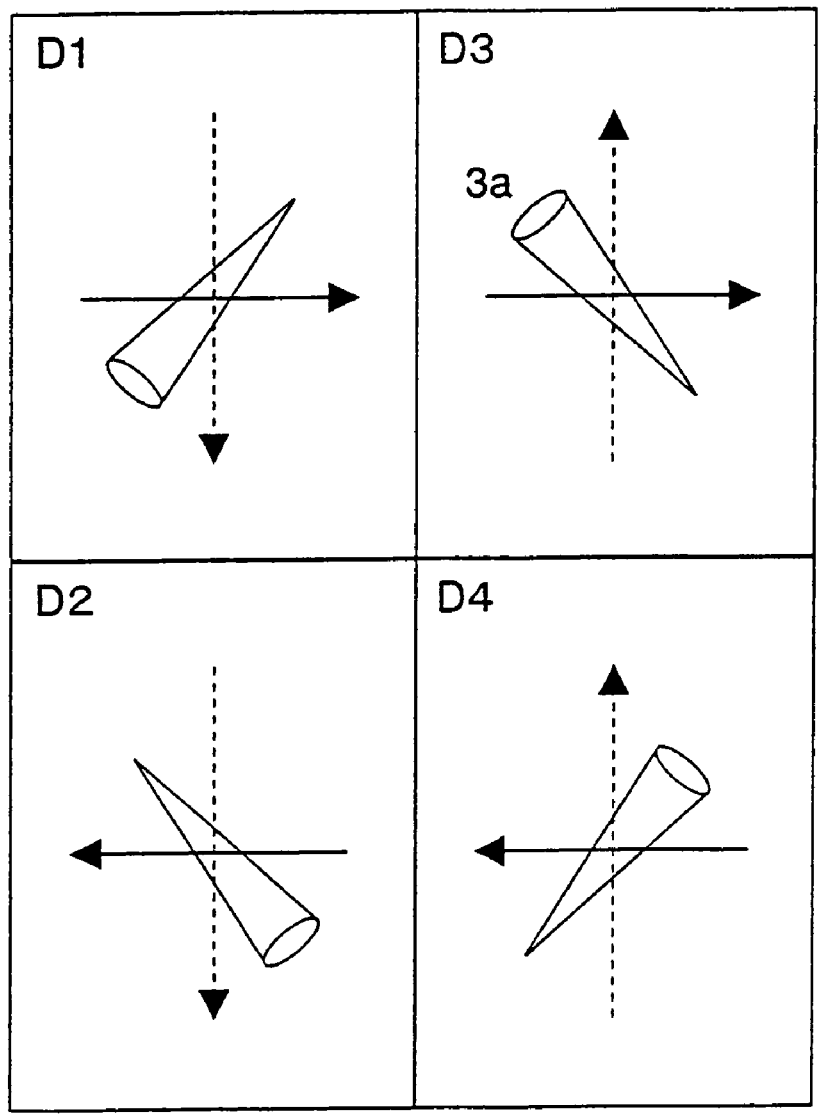
FIG. 9 is a plan view of a liquid crystal display device of Embodiment 5 viewed from a direction normal to the substrate for schematically showing a squared plus structure of one pixel when a voltage is applied.

FIG. 9 is a plan view of the liquid crystal display device of Embodiment 5 viewed along a direction normal to the substrate for schematically showing the squared plus structure of one pixel when a voltage is applied. In the descriptions regarding FIG. 9, components having a similar function as those in FIG. 5 are denoted by the same reference numerals. In FIG. 9, a dotted arrow indicates the rubbing direction of the lower substrate (the first substrate 1). A solid arrow indicates the rubbing direction of the upper substrate (the second substrate 2). The liquid crystal molecules 3a show the alignment directions of the liquid crystal molecules in a midlayer of the cell when a voltage is applied.

As shown in FIG. 9, in the liquid crystal display device 103, the first substrate 1 is processed with a rubbing process in a downward direction of FIG. 9 in domains D1 and D2, and in an upward direction of FIG. 9 in domains D3 and D4.

The second substrate 2 is processed with a rubbing process in a direction from left to right of FIG. 9 in domains D1 and D3, and in a direction from right to left of FIG. 9 in domains D2 and D3.

In such a case, a mask rubbing processes performed on the vertical alignment film 6 and 7 of the first substrate 1 and the second substrate 2 may be performed using a hard mask twice for each substrate, i.e., four times in total for two substrates. In this case, the hard mask includes opening portions having a stripe shape and mask portions which are alternately-provided.

By performing a mask rubbing process using such a hard mask, it becomes possible to provide two stripe-shape alignment regions of the liquid crystal layer 3 on each of the vertical alignment films 6 and 7 of the first substrate 1 and the second substrate 2. The direction of the tilt angle of the liquid crystal molecules 3a when there is no voltage application in an alignment region can be uniformly controlled along the alignment control direction (rubbing direction), and the alignment regions having the opposite directions of the tilt angles are alternately located. The first substrate 1 and the second substrate 2 processed by such a mask rubbing process are located such that the rubbing directions of the vertical alignment films 6 and 7 are orthogonal to each other. A portion where they cross each other is a domain. It becomes possible to separate one pixel portion into four domains arranged in a "squared plus" shape as shown in FIG. 9. Thus, it becomes possible to implement multi-domains for providing the liquid crystal display device in which the liquid crystal molecules 3a are inclined in different directions in the quartered domains when there is no voltage application, and thus, has a wide viewing angle.

FIG. 9 is a schematic view of the alignment state of the liquid crystal molecules 3a around the midlayer when a voltage of 7V is applied to the liquid crystal layer 3, viewed from the direction normal to the substrate. Multi-domains are implemented such that the liquid crystal molecules 3a in the respective domains are aligned to be inclined in directions different from each other by 90° (twist alignment). Thus, multi-domains are implemented, and a liquid crystal display device having a wide viewing angle and a high definition can be obtained.

Herein, a fabrication method of the liquid crystal display device 103 having the above-described structure will be explained.

On the first substrate 1 and the second substrate 2, for example, a vertical alignment film JALS-682 (available from JSR Corporation) is applied. A metal mask is adhered and fixed to only the first substrate 1. A mask rubbing process is performed through stripe-shape opening portions in a predetermined direction. Then, the metal mask is moved by 1 pitch, and a mask rubbing process is performed again through the stripe-shape opening portions in a direction opposite to the predetermined direction. Similarly, the second substrate 2 is processed with a rubbing process across the entire surface by using the metal mask in a direction different from the rubbing directions for the first substrate 1 by 90°. The substrates 1 and 2 are bonded to each other, with a liquid crystal material injected therebetween.

A polarizer and an analyzer are arranged in crossed nicols. Then, a liquid crystal cell is fixed between the polarizer and the analyzer such that a polarizing axis of the polarizer matches the +x direction, which is the mask rubbing direction, for performing a microscope observation. The liquid crystal molecules 3a of the liquid crystal layer 3 are in twist alignment (TN) of about 90° and light is transmitted only in a region in which the mask rubbing process is actually performed to define the alignment control direction of the liquid crystal molecules 3a in the liquid crystal layer 3. Thus, it is possible to measure the region in which the alignment control direction is defined.

In Embodiment 5, a mask rubbing process is performed through stripe-shape opening portions in a predetermined direction. Then the metal mask is moved by 1 pitch, and a mask rubbing process is performed through the stripe-shape opening portions in a direction opposite to the predetermined direction. Thus, the stripe opening regions and the rubbing process regions match each other at a high precision. An alignment (positioning) of the metal mask is easy in both the stripe directions and the stripe width directions. The mask rubbing processes can be performed at a high precision.

Embodiment 6

With reference to Embodiment 6, a mask shape will be considered.

FIGS. 10A and 10B are diagrams for illustrating a metal mask used in Embodiment 6: FIG. 10A is a plan view of the metal mask viewed from a direction normal to a metal mask surface; and FIG. 10B is a cross-sectional view of the metal mask taken along line A-A'.

In FIG. 10A and FIG. 10B, angle α indicates a taper angle of the opening portion 41a. For the metal mask 41 of Embodiment 6, the angle α is 62.8°. The design size of the opening portion 41a is 100 μm×200 μm. The opening portion interval in the x direction is 300 μm, and the opening portion interval in the y direction is 100 μm.

As reference examples, metal masks 51 and 52 having the design size (thickness and the like) the same as those of the metal mask 41 except that the taper angles α are 48.6° and 87.5°, respectively, are produced.

A material used for the metal mask 41 and the metal masks 51 and 52 is SUS430. The thickness is 50 μm. The opening portions of the metal mask 41 and the metal masks 51 and 52 are produced by an etching method.

For actually examining the size of the opening portions in the metal mask 41 of Embodiment 6 and the metal masks 51 and 52 of the reference examples (see Table 1), the length in x direction the $\Delta x$, and the length in the y direction, $\Delta y$, are measured for 10 samples which are arbitrary selected. The variance in the opening portions is examined. The results are shown in Table 1. Table 1 includes average values, maximum values, and minimum values of both $\Delta x$ and $\Delta y$.

TABLE 1

| | Taper angle | $\Delta x(\mu m)$ | | | |
|---|---|---|---|---|---|
| | α(°) | Average value | Maximum value | Minimum value | Maximum − Minimum |
| Metal mask 41 | 62.8 | 100.2 | 103.3 | 98.3 | 5.0 |
| Metal mask 51 | 48.6 | 99.8 | 105.8 | 92.4 | 13.4 |
| Metal mask 52 | 87.5 | 100.6 | 102.1 | 98.9 | 3.2 |
| | Taper angle | $\Delta y(\mu m)$ | | | |
| | α(°) | Average value | Maximum value | Minimum value | Maximum − Minimum |
| Metal mask 41 | 62.8 | 201.0 | 203.4 | 198.8 | 4.6 |
| Metal mask 51 | 48.6 | 199.3 | 206.4 | 191.3 | 15.1 |
| Metal mask 52 | 87.5 | 200.2 | 201.9 | 197.9 | 4.0 |

As can be seen from Table 1, in the metal mask 41 of Embodiment 6 and the metal mask 52 of the reference example, differences between the maximum values and the minimum values are within 5 μm. They are produced at high precision. On the other hand, in the metal mask 51 of the reference example, differences between the maximum values and the minimum values are 10 μm or higher. A margin of the outer peripheral portion located in non-display portion of the liquid crystal display device has to be Very small, or a light blocking portion having a large area is required. This is not preferable in practical use. The metal mask 51 has a small taper angle, 48.6°. In order to suppress the taper angle to such a small degree, it is necessary to perform a process having conditions which are difficult to be set. Specifically, when producing the metal mask 51 by an etching method, the metal mask 51 has to be dug deep from one side, and very shallow from the other side. Thus, a problem that a large variance in the lengths of the opening portions occurs. Therefore, it is preferable that the taper angle of the metal mask 51 is 60° or larger for dividing the liquid crystal layer into domains at a high precision. The taper angle can be controlled by altering the depth to be dug from one side to the other.

Next, the variances-in the length of the rubbing shades of these three types of metal masks, the metal mask 41 and the metal masks 51 and 52, are examined. As described above, the metal mask 41 and the metal masks 51 and 52 have limited thickness (few tens of μm). Thus, when a mask rubbing process is performed, the size of the regions processed with a mask rubbing process become smaller than the size of the metal mask 41 and the metal masks 51 and 52 in the mask rubbing directions.

Figure 11A:
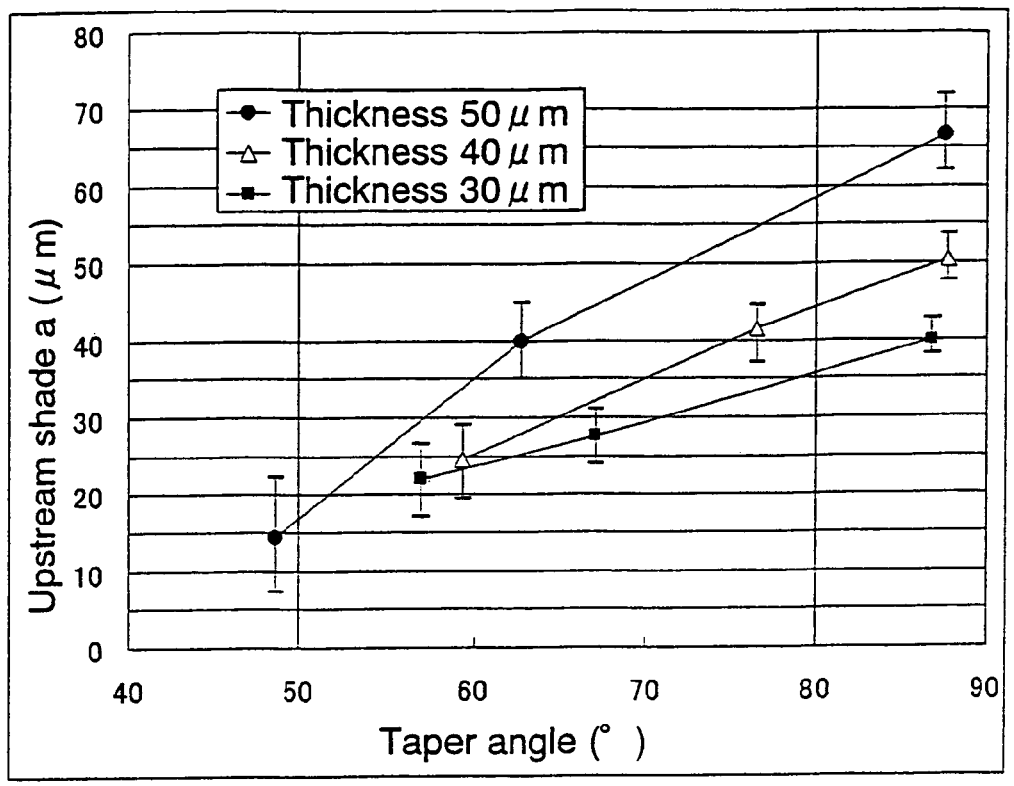
FIG. 11A is a graph showing measurement results of rubbing upstream shades generated when a mask rubbing process is performed using the hard mask of Embodiment 6.
Figure 11B:
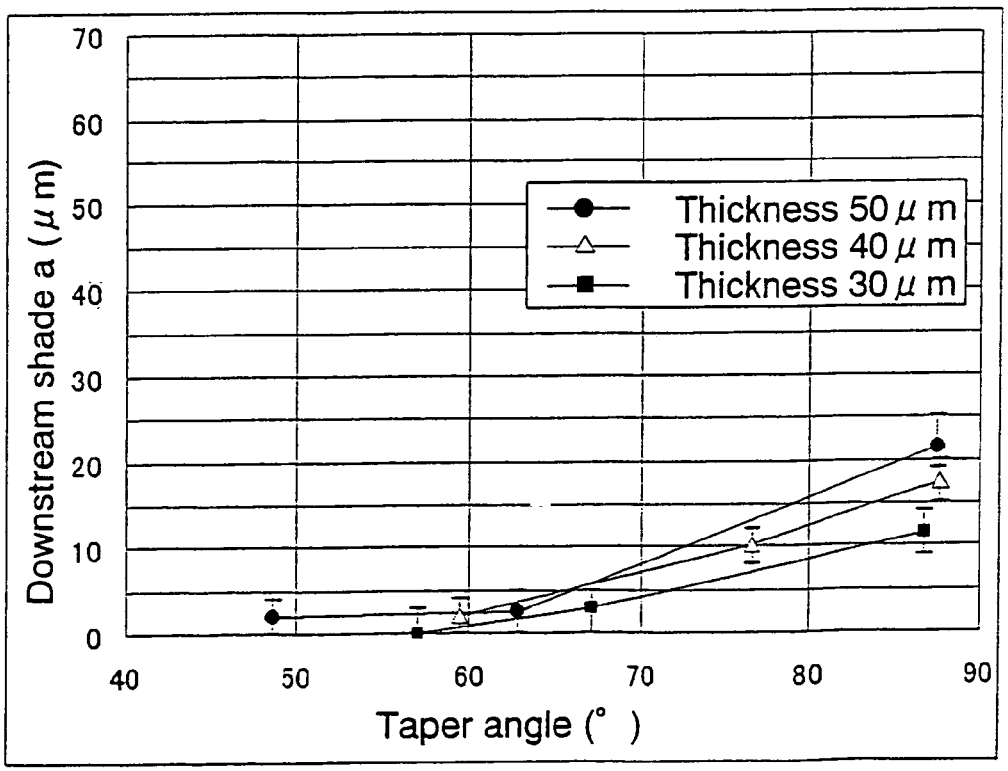
FIG. 11B is a graph showing measurement results of downstream shades.

With respect to the rubbing direction (left to right), a shade at the side where the rubbing cloth first contacts (upstream shade a) and a shade at the side where the rubbing cloth departs (downstream shade b) are measured. The results are shown in FIGS. 11A and 11B. In FIGS. 11A and 11B, the results of measuring the average values, the maximum values, and minimum values of the upstream shade a and the downstream shade b are respectively indicated by solid circles. Also, in FIGS. 11A and 11B, the results when the metal masks having the same material and design values but a thickness of 40 μm and 30 μm are indicated by blank triangles and solid squares.

As can be seen from FIGS. 11A and 11B, a small taper angle is preferable in terms of design because the lengths of the upstream shade a and the downstream shade b can be made smaller. Further, thin metal mask 41 and metal masks 51 and 52 are preferable in terms of design because the lengths of the upstream shade a and the downstream shade b can be made smaller.

However, if the metal mask 41 or metal masks 51 or 52 is too thin, the mask will be like a sheet and this is not preferable in terms of handling and strength. As the results of the detailed experiments of the present inventors shows, it is preferable that the thickness of the metal mask is within the range of 30 μm to 50 μm (inclusive) in view of handling and the precision of the rubbing region.

It is preferable in terms of design when the taper angle is 70° or smaller, because the downstream shade b is within the range of a few μm. This allows the mask to be designed without considering the downstream shade. However, when the taper angle is 60° or smaller, the average of the lengths of the shades is reduced, but the precision of the opening portions of the metal mask are deteriorated. As described above, the linear characteristic of the mask opening portion deteriorates. The variances become large. Specifically, a difference of the maximum value and the minimum value of the lengths of the opening portions is about 15 μm. This makes it difficult to control dividing into domains. As a result, the optimum range of the taper angle of the metal mask is from 60° to 70° in view of the precision of the rubbing region.

In the above description of Embodiment 6, the metal mask having predetermined opening portions by an etching method are mainly discussed. The present inventors have also examined a metal mask having predetermined opening portions formed by an electroforming method.

The electroforming method is a method for patterning a resist on a substrate into a desired width and height beforehand, and producing a nickel-cobalt alloy by plating. In this method, it is difficult to provide a taper angle as such in the etching method. The taper angle is about 90° and the side of the cross-section is almost vertical. However, it is possible to improve the size precision of the opening portions. The present inventors confirmed that, there may be the case where a mask rubbing process using the metal mask produced by the electroforming method is more suitable, depending on a layout of a TFT substrate or a CF (color filter) substrate of the liquid crystal display device.

Embodiment 7

With reference to Embodiment 7, an example in which a shock absorbing section is provided in the non-opened portion (mask portion) of the hard mask on the side facing an alignment film surface in order to prevent the alignment film surface adhered to the non-opened portion (mask portion) of the hard mask will be described.

FIGS. 12A and 12B are cross-sectional views schematically showing one pixel portion of the liquid crystal display device of Embodiment 7: FIG. 12A shows an example of the liquid crystal display device of Embodiment 7 when there is no voltage application; and FIG. 12B shows an example of an alignment state of the liquid crystal molecules of the liquid crystal layer when a sufficiently high voltage having a predetermined threshold value or higher is applied to the liquid crystal display device of Embodiment 7. The components having similar functions as those shown in FIGS. 1 and 2 are denoted by the same reference numerals.

As shown in FIG. 12, a liquid crystal display device 104 of Embodiment 7 is similar to the liquid crystal display device of Embodiment 1. The liquid crystal display device 104 includes: a first substrate (for example, a TFT substrate) 1; a second substrate (for example, a color filter substrate (CF substrate)) 2; and a liquid crystal layer 3 of a vertical-alignment type, which is provided between the first substrate 1 and the second substrate 2. Transparent electrodes 4 and 5 for applying voltages to the liquid crystal layer 3 are provided on the first substrate 1 and the second substrate 2.

The liquid crystal layer 3 of the vertical-alignment type is formed of, in general, a nematic liquid crystal material having a negative dielectric anisotropy. The liquid crystal layer 3 is sandwiched and held by a vertical alignment film 6A provided on the transparent electrode 4 on the first substrate 1 on the side facing the liquid crystal layer 3 and a vertical alignment film 7A provided on transparent electrode 5 on the second substrate 2 facing the liquid crystal layer 3. Liquid crystal molecules 3a in the liquid crystal layer 3 are substantially vertical to surfaces of the vertical alignment films 6A and 7A when a driving voltage is not applied. Actually, the liquid crystal molecules 3a are aligned with a small inclination angle of a little less than 1° to a few degrees with respect to the surfaces of the vertical alignment films 6 and 7. When a voltage is applied in a direction vertical to the surface of liquid crystal layer 3, liquid crystal molecules 3a are inclined toward a certain direction when a voltage of a threshold value or higher is applied, due to the preset tilt angle. When a sufficient voltage is applied, the liquid crystal molecules 3a of the liquid crystal layer 3 are aligned nearly parallel to the first substrate 1 and the second substrate 2. The direction in which the liquid crystal molecules 3a are inclined is defined by alignment control directions (indicated by arrows in the figure) of the surfaces of the vertical alignment film 6A provided on the first substrate 1 and the vertical alignment film 7A provided on the second substrate 2.

In the liquid crystal display device 104 of Embodiment 7, the alignment control directions of the surfaces of the vertical alignment films are defined by performing a mask rubbing process only on desired portions by using a hard mask. The hard mask has an opening designed in accordance with the pixel size and the pixel pitch. The hard mask used in Embodiment 7 does not mean a glass mask such as that used in a photolithography process (for example, a glass substrate with a metal film such as Cr patterned thereon). The hard mask used in Embodiment 7 means, for example, a mask formed of a metal plate, aplastic plate, a glass plate and the like having a thickness of a few tens of μm, and has an actual hole (opening) only in a region in which a mask rubbing process is intended to be performed. There is no specific limitation in materials. However, it is preferable to use a material having a low coefficient of expansion and a high hardness. For example, in the case where a metal plate mask (metal mask) is used, materials such as stainless steel (SUS430 or SUS304), invar material, 42 alloy, nickel and cobalt alloy and the like are preferable. Such metal masks are fabricated by different methods depending on their materials. For example, most of them are fabricated by two different methods: an etching method; and an additive method. In the etching method, a resist is applied on a metal plate, and only a portion corresponding to the opening is exposed to an ultra violet ray, developed and etched to form an opening on a metal plate. In the additive method, a resist of a thickness is provided on an appropriate member and patterned, and metal is plated.

In the liquid crystal display device 101 of Embodiment 7, the liquid crystal layer 3 includes a plurality of domains (for example, four domains in the figure) in one pixel portion. The domains have a mask rubbing direction different from each other by a mask rubbing process using a hard mask. In FIG. 12, the four domains are indicated by D1, D2, D3 and D4, respectively, as in FIGS. 1 and 2. By performing a mask rubbing process using a hard mask in this way, the liquid crystal layer 3 can be set to a plurality of domains (four domains in FIG. 12). In the domains, the directions of the tilt angles of the liquid crystal molecules 3a when there is no voltage application are controlled along the alignment control directions (rubbing directions), and they are different from each other. Thus, it becomes possible to produce multi-domains necessary for obtaining a liquid crystal display device having different directions of the liquid crystal molecules 3a inclined when a voltage of a threshold value or higher is applied in the domains, and having a wide viewing angle.

As shown in FIG. 12, the liquid crystal molecules 3a are inclined toward a certain direction when a driving voltage is applied in domains. The liquid crystal molecules 3a are substantially parallel to the first substrate 1 and the second substrate 2. The multi-domains are thus implemented, and a liquid crystal display device with a wide viewing angle and a high definition can be obtained.

A fabrication method of the liquid crystal display device 104 of Embodiment 7 will be described with reference to FIGS. 4A to 4F and FIG. 13. Now, FIGS. 4A to 4F are used as an example of the fabrication method for fabricating four domains D1 to D4 in the liquid crystal display device 104 of Embodiment 7. FIG. 13 is a diagram for illustrating a mask used in Embodiment 7. For the sake of the simplicity, only a fabrication process of the first substrate 1 is shown. However, the second substrate 2 can also be fabricated with a similar process as the first substrate 1.

The liquid crystal display device 104 of Embodiment 7 is different from the liquid crystal display device 101 of Embodiment 1 on the point that the hard mask 8A having the shock-absorbing section (or a stress-buffering section) is used in a rubbing process for the vertical alignment films 6A and 7A instead of the hard mask 8 which does not have a shock-absorbing section and is used in a rubbing process for the vertical alignment films 6 and 7 of Embodiment 1.

First, as shown in FIG. 4A, on the transparent electrode 4 of the first substrate 1, the vertical alignment film 6A is formed. The vertical alignment film 6A is formed of, for example, a polyimide vertical alignment film JALS-682 (available from JSR Corporation) and is formed by a spin coat method to a film thickness of 500 angstrom.

Next, the hard mask 8A as described above is put on the vertical alignment film 6A to perform a rubbing process. The hard mask 8A may be a metal mask which is, for example, formed of stainless steel (SUS430) having a thickness of 50 μm, and has, for example, openings of 100 μm (x direction)× 200 μm (y direction). In FIG. 13B, the x direction is a direction toward the right side in the plane of the paper, and they direction is a direction heading toward the plane of the paper.

Figure 13A:
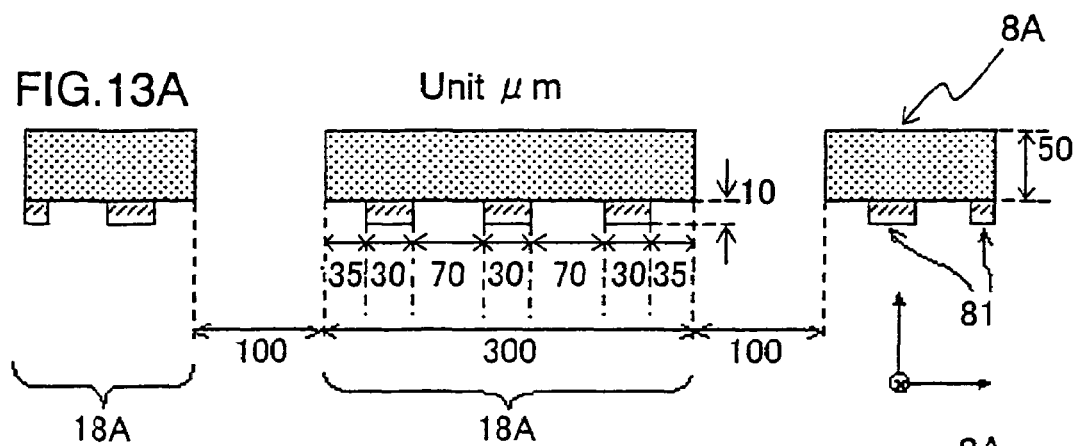
FIGS. 13a-13B are diagrams for illustrating a hard mask used in Embodiment 7 of the present invention.
Figure 13B:
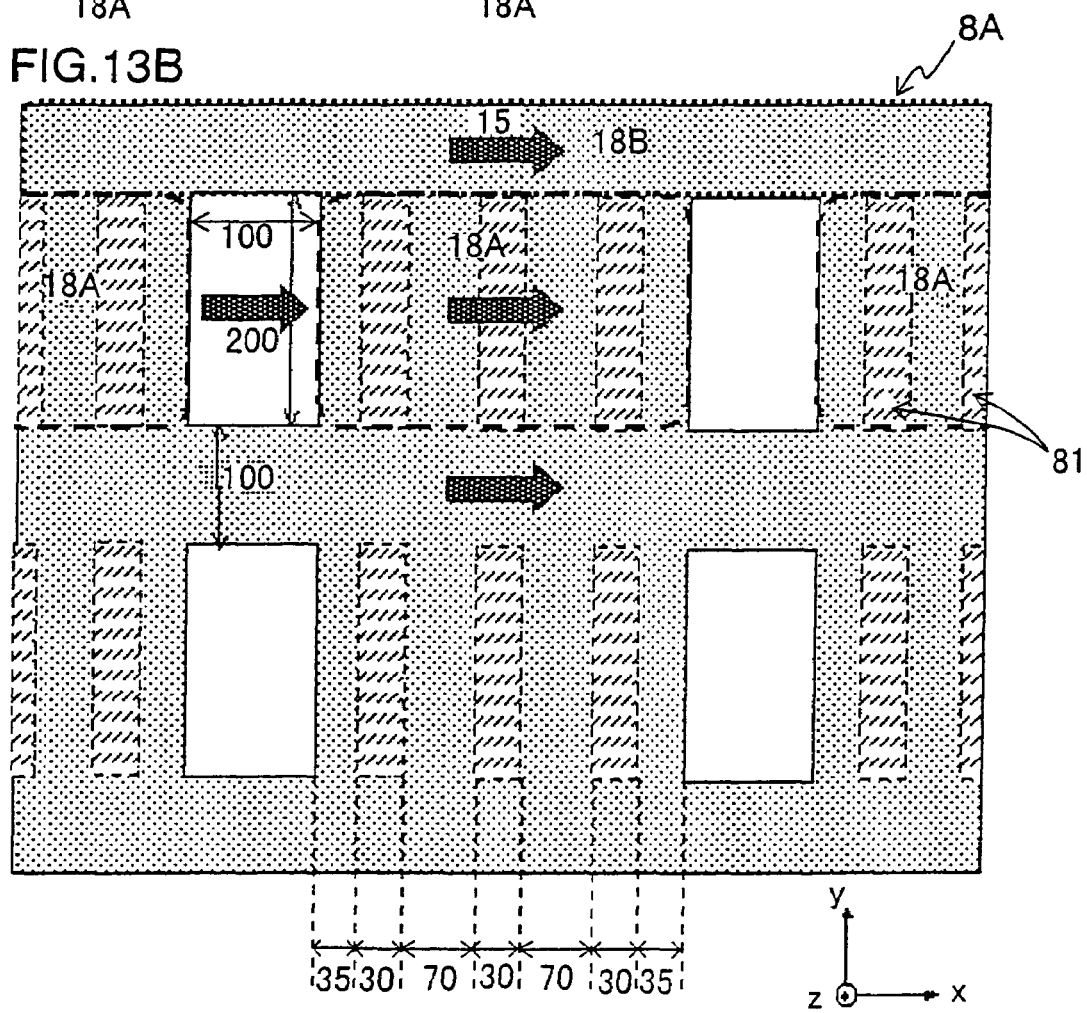

As shown in FIG. 13, the mask 8A including ribs (or rib portions, protrusions) 81 (not shown in FIG. 4) as shock-absorbing sections in the non-opened portion on the side facing the alignment film for shock absorption (or stress buffering) is used. The ribs 81 are obtained by further applying a resist to the non-opened portions of the mask 8A and patterning the resist by a photolithography process. As shown in FIG. 13A, a plurality of the ribs 81 of the metal mask of Embodiment 7 are formed in the non-opened portion between the opening portions adjacent to each other in the rubbing direction, along the direction perpendicular to the rubbing direction rubbing direction. The width of each of the ribs 81 is 30 μm, and the height is 10 μm. Herein, the height is set to be about 10 μm in consideration that the ribs 81 of 10 μm or higher increases the total mask thickness and causes the length of the rubbing shade to become longer.

The opening portion of the hard mask 8A is provided to be larger than the domain size in the pixel with respect to the rubbing direction. Particularly, the opening portion is provided such that the upstream side in the rubbing direction is larger than the downstream side. Further, the end surface of the opening portion in the rubbing vertical direction is located so as to be positioned in the non-opened portion of the pixel.

As shown in FIG. 4B, the openings of the metal mask 8A are aligned to the positions corresponding domain D2 and fixed. Then a rubbing roller 10 is used thereon, and a mask rubbing process is performed along a predetermined direction (the direction to the right in FIG. 4B). The rubbing roller 10 is surrounded by rubbing cloth 9, which is, for example, rayon cloth YA-19R (available from Yoshikawa Kagaku Kogyo Co. Ltd.). Rubbing conditions are, for example, the movement velocity of the first substrate 1 of 50 mm/sec, the rotation rate of the roller 10 of 500 rpm, and the degree of the debris pushed in d of 0.4 mm. The radius of the roller 10 R is 7.5 cm.

As described above, first, only a portion corresponding to domain D2 is processed with the alignment control process in a predetermined direction. Other portions are covered with non-opened portions (mask portions) of the metal mask 8. Thus, they are not processed with the alignment control process. Then, as shown in FIG. 4C, the metal mask 8A is shifted by only 100 μm to the right. The openings of the metal mask are aligned with the position corresponding to domain D3. Then, the mask rubbing process is performed in the direction toward the left by a similar procedure. As shown in FIG. 4D, the mask rubbing process is performed in the direction heading toward the plane of the paper with a similar procedure. Thereafter, as shown in FIG. 4E, the openings of the metal mask are aligned with the position corresponding to domain D4, and the mask rubbing process is performed in a direction coming out of the plane of the paper. After such mask rubbing processes, as shown in FIG. 4F, the vertical alignment film 6A on the first substrate 1 is divided into regions having four alignment control directions.

The second substrate 2 which opposes the first substrate 1 is also divided to have four alignment control directions divided by a similar process. The first substrate 1 and the second substrate 2 are applied with spacer beads and attached to each other so as to have predetermined cell gaps, for example, cell gaps of 3.5 μm. Then, a nematic liquid crystal material having a negative dielectric anisotropy, for example, n-type liquid crystal (available from Merck KGaA) MJ001025 (Δn=0.0916, Δε=−2.4, Tni=80° C.) is injected between the first substrate 1 and the second substrate 2 and enclosed at a temperature of 60° C. Then, as a re-alignment processing step, the liquid crystal display device is kept in an oven set to about 120° C. for approximately ten minutes and gradually cooled down to room temperature (about 25° C.) at a rate of 10° C./hours.

In the liquid crystal display device 104 fabricated as such, the liquid crystal layer 3 is confirmed to be divided into four domains and aligned as shown in FIG. 12A when there is no voltage application. Further, the tilt angles in the domains are measured by a crystal rotation method. The tilt angles in all the domains are 88.5°. It is confirmed that when a voltage of the threshold value or higher is applied to the liquid crystal display device 104 fabricated as such, the liquid crystal molecules 3a are aligned along the alignment control direction defined by the mask rubbing process in the respective domains as shown in FIG. 12B. It is also confirmed that when a sufficient voltage, for example, 7V, is applied, the liquid crystal molecules 3a are aligned substantially parallel with the first substrate 1 and the second substrate 2. Furthermore, it is confirmed that the inclination directions of the liquid crystal molecules 3a in the respective domains are different from each other by 90°, and a wide viewing angle is implemented.

In the liquid crystal display device 104 described with reference to Embodiment 7, for forming four domains having different alignment control directions, as shown in FIGS. 4A to 4F, mask rubbing processes are required 8 times in total for two substrates: four times each for the first substrate 1 and the second substrate 2. In such a case, four alignment control directions are achieved, the structure is not limited to the one shown in FIG. 12, but may be the one shown in FIG. 5 so as to reduce the number of the mask rubbing processes. In FIG. 5, among the four domains of the substrate, the rubbing directions of two adjacent domains are the same. A position where the rubbing directions change (a border between domains) in one of the substrates 1 and 2 and a position where the rubbing directions change in the other are shifted by half a pitch (one domain). In such a case, the mask rubbing processes performed on the vertical alignment film 6A and 7A of the first substrate 1 and the second substrate 2 may be performed twice for each substrate, i.e., four times in total for two substrates. In this case, it is also possible to divide and aligne four domains when a voltage of a certain threshold value or higher is applied. FIG. 5B is a schematic diagram viewing an alignment state of the liquid crystal molecules 3a when, for example, a voltage of 7V is applied to the liquid crystal layer 3 from a direction normal to the substrate. In this case, multiple domains are provided to have inclination alignment such that the liquid crystal molecules 3a around the middle of the liquid crystal layer 3 are inclined in four directions different from each other by 90°. The alignment state in Embodiment 7 (FIG. 12B) and the alignment state shown in FIG. 5B have the following difference. When a sufficiently high voltage (for example, 7V) is applied, the liquid crystal molecules 3a are in a parallel alignment state in FIG. 2 in the former, while the liquid crystal molecules 3a are in the twist alignment in which twists are concentrated around the interface between the first substrate 1 and the second substrate 2 in the latter. However, as the result of detailed examination of the viewing angle properties by the present inventors, no significant difference was found between them. Their viewing angle properties are substantially the same.

As described above, the metal mask opening portion And the mask rubbing region do not match each other. The length of the mask rubbing region with respect to the rubbing direction is shorter than the length of the metal mask opening portion by the amount which depends on the thickness of the metal mask. Therefore, when the liquid crystal display device 104 of Embodiment 7 is actually produced, it is necessary to perform a mask rubbing process after the positioning is performed using the hard mask 8A which has a larger area compared to that of the domain size in each of the pixels. Thus, it becomes possible to display accurately.

Further, the end surfaces of the mask rubbing region, particularly, in the mask rubbing directions, become zigzag surfaces with a certain width due to variances in the contact points and the departing points of the rubbing cloth. When the liquid crystal display device 104 of Embodiment 7 is actually produced, if such a zigzag end portion is seen, it deteriorates the display definition. Thus, it is necessary to locate outer peripheral portions of the domains in a non-display portion covered by a black matrix, source lines, gate lines, supplementary volume lines, and the like, so as not to affect the display.

Next, a fabrication method of a liquid crystal display device 104 of Embodiment 7 will be described by comparing a more specific example with a comparative example.

Figure 14A:
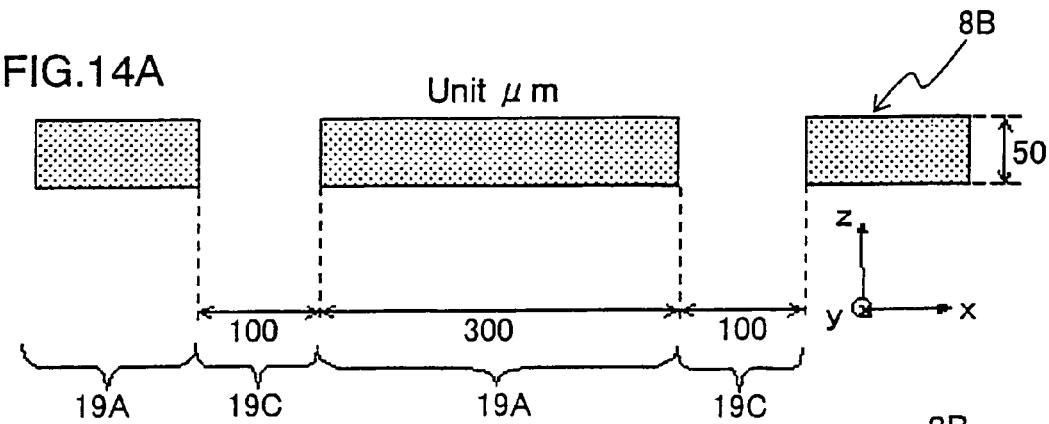
FIGS. 14A and 14B are diagrams for illustrating a hard mask using a fabrication method of a comparative example.
Figure 14B:
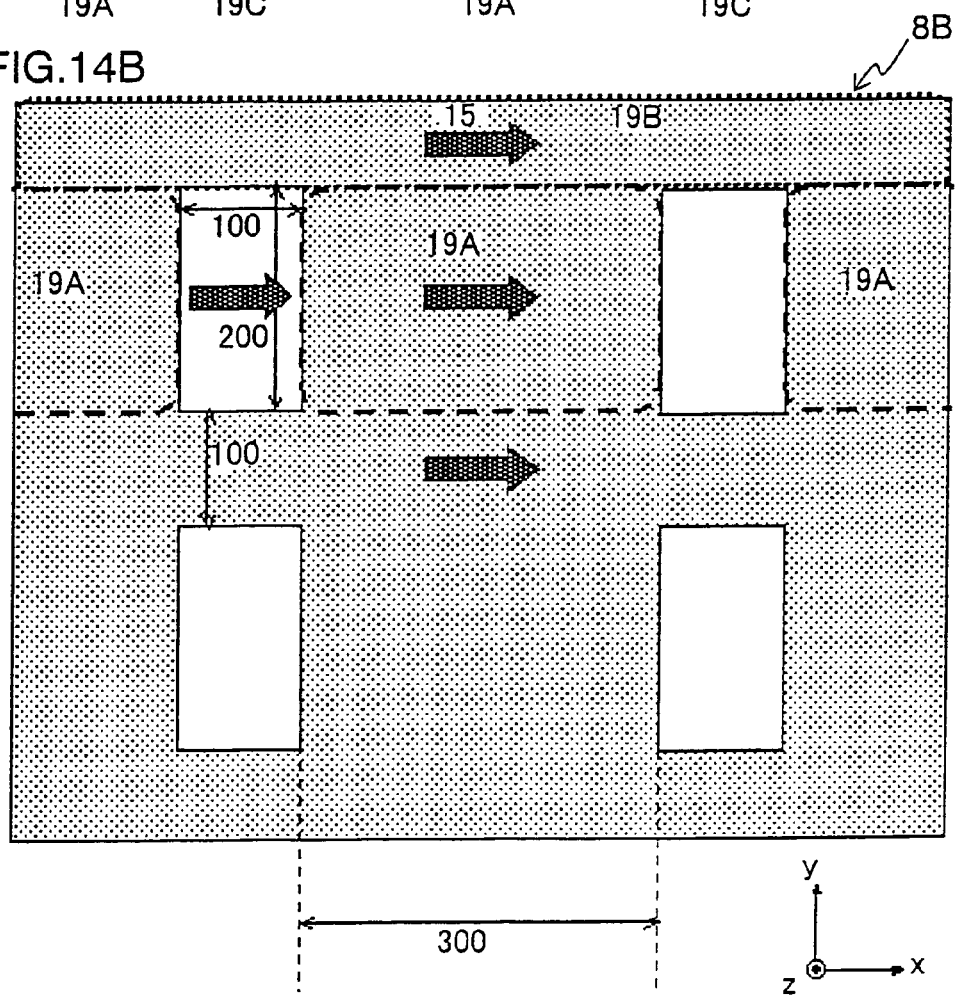

In Embodiment 7, in order to avoid damage on the alignment film covered by the non-opened portion of the metal mask 8A due to pressure (some kind of moment) when a mask rubbing process is performed using the metal mask 8A having the opening portions and non-opened portions, the metal mask 8A including the ribs (protrusions) 81 on the side facing the alignment film surface is used. On the other hand, the comparative example uses a metal mask 8B which does not have such a ribs (protrusion) (see FIG. 14).

A mask rubbing process for one domain was performed in accordance with a process flow of FIG. 15. FIG. 15 shows a process flow when the metal mask 8A of Embodiment 7 is used. However, the comparative example using the metal mask 8B is the same except that there is no rib 81. The metal mask 8A of Embodiment 7 and comparative example using the metal mask 8B are fabricated by the additive method. They are different from a metal mask fabricated by the etching method in that the opening portion end surfaces as described above rarely have a taper angle, and the cross-section is vertical. Further, round corners (corners R) as described above hardly exist in the corners of the opening portion.

The rib portions 81 of the metal mask 8A of Embodiment 7 are obtained by further applying a resist to the non-opened portions of the mask 8A and patterning the resist by a photolithography process. The width of each of the ribs 81 is 30 μm, and the height is 10 μm. Herein, the height is set to be about 10 μm in consideration that the ribs 81 of 10 μm or higher increases the total mask thickness and causes the length of the rubbing shade to become longer.

The ribs 81 of the metal mask 8A of Embodiment 7 are provided in the positions as shown in FIG. 6A such that the longitudinal direction is perpendicular to the mask rubbing direction as shown in FIG. 6B. A pair of substrates with alignment film surfaces treated with vertical alignment film JALS-682 is processed with mask rubbing process respectively using the metal mask 8A of Embodiment 7 and the metal mask 8B of the comparative example. A pair of substrates for the opposite side with alignment film surfaces treated with vertical alignment film JALS-682 is processed with a rubbing process across the entire surface. One from each of the pairs are bonded together to form a liquid crystal cell 16 and the other from each of the pairs are bonded to form a liquid crystal cell 17. The liquid crystal cell 16 is the one processed with the mask rubbing process using the metal mask 8A of Embodiment 7. The liquid crystal cell 17 is a liquid crystal cell processed with the mask rubbing process using metal mask 8B of the comparative example. The liquid crystal cells 16 and 17 are both arranged such that the rubbing directions of the opposite side substrates (+y directions) are orthogonal to the mask rubbing directions (+x directions). In FIGS. 16 and 17, solid line arrows indicate the mask rubbing directions on the substrates processed with the mask rubbing process, and dotted line arrows indicate the rubbing directions on the opposite side substrates across the entire surface.

N-type liquid crystal (available from Merck KGaA) MJ001025 ($\Delta n=0.0916$, $\Delta\epsilon=-2.4$, Tni=80° C.) is injected into these two liquid crystal cells and enclosed at a temperature of 60° C. Then, as a re-alignment processing step, the liquid crystal display device is kept in an oven set to about 120° C. for approximately ten minutes and gradually cooled down to room temperature (about 25° C.) at a rate of 10° C./hours. The liquid crystal cells 16 and 17 are fixed under the crossed nicols of a polarization microscope such that the rubbing direction of one substrate matches a polarization axis of a polarizer and the rubbing direction of the other substrate matches an analyzer direction. A rectangular pulse of 30 Hz is applied such that an effective voltage value is 6.2 V. It is observed that only the mask rubbing regions are in TN alignment and light is transmitted therethrough. The regions which are not subjected to a mask rubbing process remained black. In this state, no difference is observed in the alignment states of the liquid crystal cell 16 produced by using the metal mask 8A of Embodiment 7 and the liquid crystal cell 17 produced by using the metal mask 8B of the comparative example by human eyes.

Figure 19:
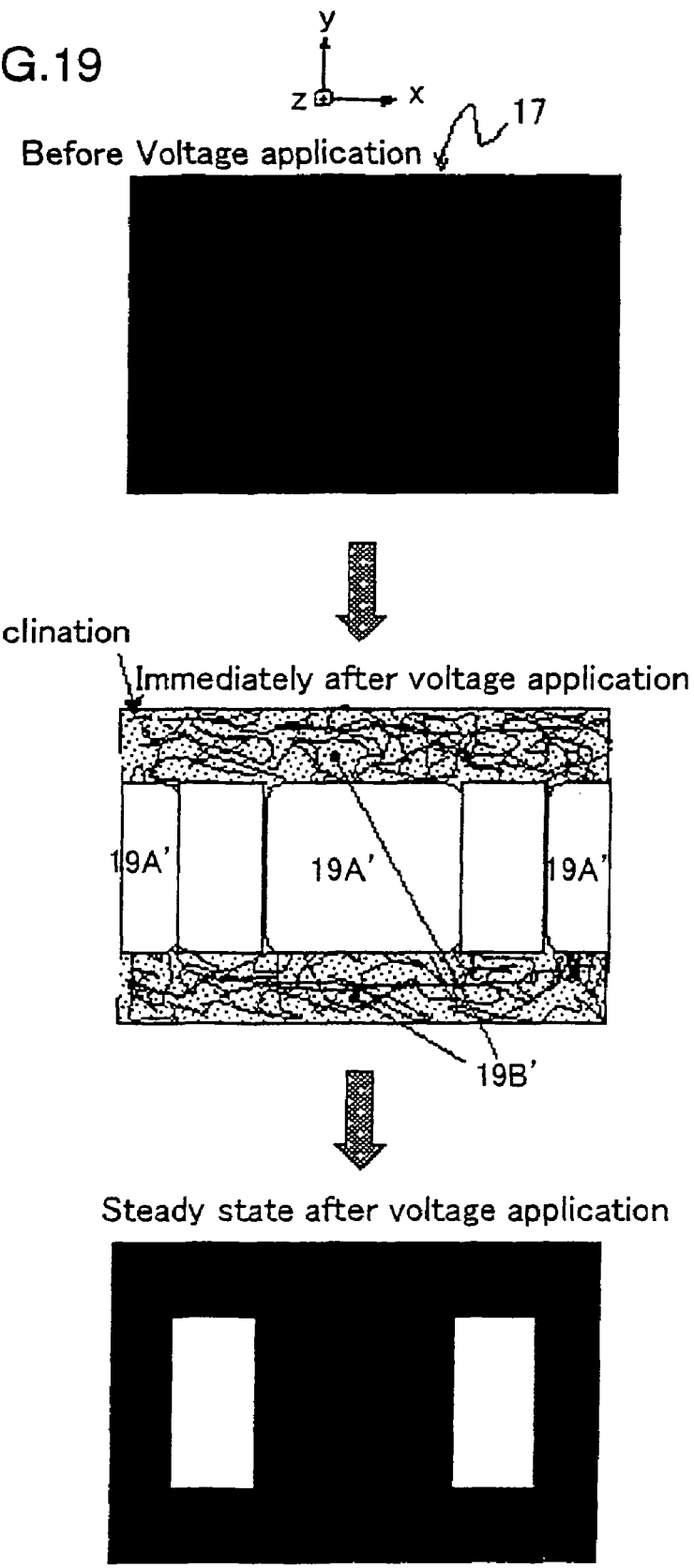
FIG. 19 is a schematic diagram for illustrating a dynamic response alignment state in the liquid crystal cell of the comparative example.

Thereafter, dynamic alignment states are observed by switching on and off the voltage of 6.2V. Then, a clear difference is observed between a portion 18A' covered by the non-opened portion 18A of the metal mask 8A in the liquid crystal cell 16 and a portion 19A' covered by the non-opened portion 19A of the metal mask 8B in the liquid crystal cell 17. FIGS. 18 and 19 show images of the results observed by human eyes. In the liquid crystal cell 16, both the portion 18A' covered by the non-opened portion 18A and the portion 18B' covered by the non-opened portion 18B become dark after disclination lines randomly appear at the moment when the voltage is switched off. On the other hand, in the liquid crystal cell 17 of the comparative example, the portion 19B' covered by the non-opened portion 19B similarly becomes dark after disclination lines randomly appear at the moment when the voltage is switched off while the portion 19A' covered by the non-opened portion 19A becomes uniformly bright, and then becomes dark. This means that, in the liquid crystal cell 17 of the comparative example, the portion 19A' covered by the non-opened portion 19A is also given a certain directionality when the mask rubbing process is performed. It is considered: since there is no protrusion such as rib on the non-opened portion 19A in the liquid crystal cell 17, the metal mask 8B is adhered to the alignment film while the mask rubbing process is performed. The alignment film is rubbed in the rubbing process via the metal mask 8B adhered thereto, and thus, some kind of pressure (moment) is transferred to the alignment film. More specifically, debris of the rubbing cloth (pile) directly touches the alignment film in the opening portion 19C of the metal mask 8B. Immediately after, the debris runs on the non-opened portion 19A. It is supposed that the debris jolts the alignment film surface with the non-opened portion of the metal mask 8B and thus the alignment film surface below suffers damage. It is considered that the pressure (moment) affects the active behaviors of the liquid crystal molecules, and the portion 19A' covered by the non-opened portion of the metal mask 8B goes through momentary control of the relaxation direction of liquid crystal molecules and a uniform alignment change.

Regarding the portion 18B' covered by the non-opened portion 18B of the metal mask 8A and the portion 19B' covered by the non-opened portion 19B of the metal mask 8B, both liquid crystal cells 16 and 17 go through random relaxation alignment changes, and there is no difference. This is because the portions covered by non-opened opening portions 18B and 19B are the portions without an opening portion, which are covered by the non-opened portions of the masks throughout the rubbing process. There is no place where the rubbing cloth (pile) enters and then goes out while jolting them. Thus, the alignment film does not receive damage, and random relaxation alignment change occurs. The random relaxation alignment change means that there is no damage caused by the mask rubbing process. Thus, it is recognized that, in the liquid crystal cell 16 produced by using the metal mask 8A of Embodiment 7, pressure (moment) to the non-opened portion can be effectively avoided by providing the ribs 81 on the alignment film surface of the metal mask 8A. In the mask rubbing process using the metal mask, it is essential to apply the alignment control direction of the liquid crystal molecules to only desired portions (portions under opening portions of the metal mask) and to avoid applying pressure (damage) to other portions as much as possible. If pressure (moment) is applied to the portions under the non-opened portions of the metal mask as in the liquid crystal cell 17 produced by using the metal mask 8B of the comparative example, it is not possible to apply the desired alignment control power when the opening portions of the metal mask 8B are shifted to the non-opened portions for performing the mask rubbing process in different directions in other words, the pressure (moment) which has been applied before cannot be completely eliminated, and as a result, even though the identical tilt angles are obtained in all of the domains when multi-domains are implemented, dynamic relaxation alignment changes are different. The detailed study by the present inventors shows that the rapid response property, as expected, cannot be achieved, or a dynamic wide viewing angle cannot be implemented as a result. On the other hand, in a mask rubbing process using the metal mask 8A, the ribs (protrusions) 81 are provided in parts of the non-opened portions of the metal mask 8A to completely eliminate pressure (moment) to be applied to the non-opened portion. Thus, the liquid crystal display device which can provide an accurate display can be fabricated.

For applying a metal mask rubbing process of the present invention to an actual TFT panel, it is needless to say that the opening portions, the non-opened portions, pitches thereof and the like of the metal mask have to be designed so as to conform to the specification of the TFT substrate, the CF substrate, or the like. Further, it is preferable that the positions of the ribs provided under non-opened portions of the mask are fixed so as to be on, for example, source lines, gate lines, supplementary volume lines, contact holes, or TFT elements of the TFT substrates, or on a black matrix of the CF substrate, and the mask rubbing process is performed over them, if possible. This is because the ribs can eliminate the pressure (moment) on the portions other than under the non-opened portions, but in some case, or in accordance with the shape and the size of the ribs, the alignment film surface in contact with the ribs may receive damage and affect the relaxation alignment process. Thus, it is preferable to design the metal mask such that the rib portions contact the non-display portion which does not contribute to the display on the TFT substrate and the CF substrate.

Figure 20:
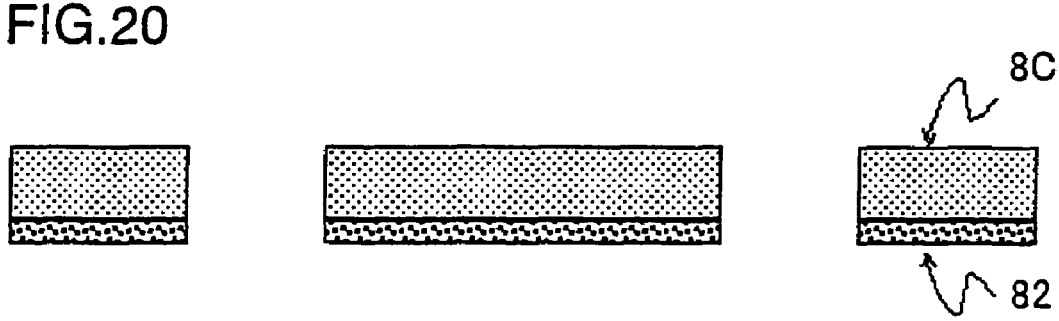
FIG. 20 is a cross-sectional view for illustrating another example of the hard mask in Embodiment 7 of the present invention.

The method for performing a mask rubbing process using a mask, which has the shock-absorbing ribs in parts of the non-opened portions of the hard mask 8A (metal mask) on the side facing the alignment film, has been mainly discussed above. It is also found that similar effects can be achieved by providing ribs (shock absorbing layer) on the entire surface of the non-opened portions, depending on a material used for the ribs (elastic material such as rubber which absorbs pressure). An example is shown in FIG. 20. An entire surface rib 82 is obtained by, for example, dip-coating the metal mask 8C with a photosensitive polyimide solution. The thickness is in the range of sub-microns to a few microns. It is shown that such a polyimide thin mask can serve as a shock-absorbing layer when a mask rubbing process is performed, and has a moment (pressure) elimination effect on the alignment film surface under the non-opened portions as described above.

The hard mask 8A of Embodiment 7, which has an opening portion with a vertical cross-section as shown in FIG. 13, has been described above. However, the present invention is not limited to this. It may be better to shape the opening portions to be tapered as described with reference to FIG. 6. The precision of the rubbing region can be improved by performing a rubbing process on the alignment film with parts or the entirety of the metal mask 8A having a thickness, including the thickness of the shock-absorbing section, in the range from 30 μm to 50 μm (inclusive) and a taper angle of 60° to 70° (inclusive).

Embodiment 8

Figure 21:
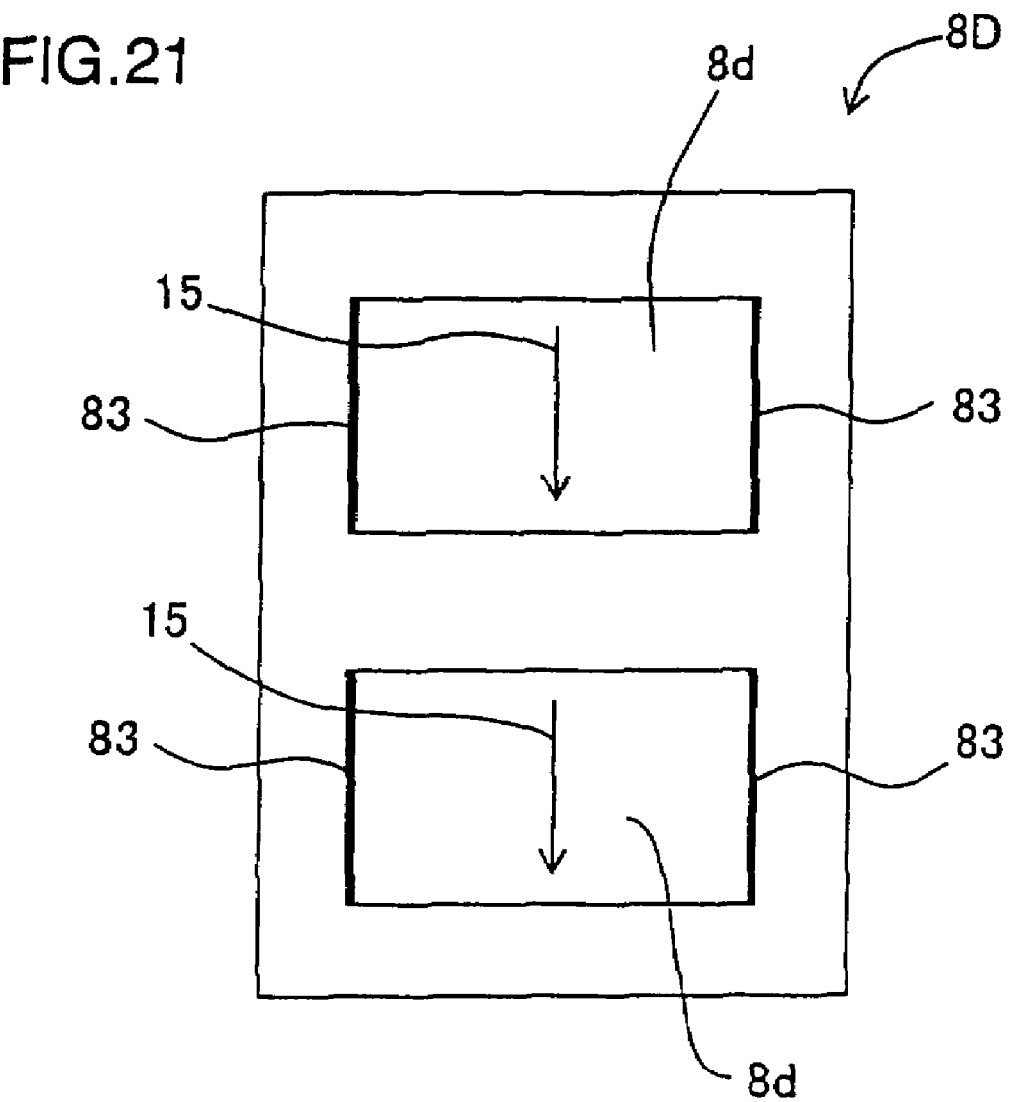
FIG. 21 is a plan view for illustrating an example of a hard mask in Embodiment 8 of the present invention.

In Embodiment 7, the metal mask 8A (see FIG. 13) having the ribs 81 for shock-absorbing on the parts of the side facing the alignment film is used. The rubbing process is performed, with the mask surface being lifted from the alignment film surface by the ribs at about 10 μm, and through the openings. In Embodiment 8, as shown in FIG. 21, a metal mask 8D is used. The metal mask 8D may include ribs, for improving the precision of the width direction dimension, protruding (by about 5 to 9 μm) from edge portions 83 on both sides of opening portions 83 with respect to rubbing direction 15, which are in the same direction as the ribs 81, but shorter than the ribs 81. In this example, the rubbing cloth does not come out from the lifted portion on both sides of the opening portions when the rubbing process is performed, because of the ribs for improving the precision of the width direction dimension of the rubbing regions. Thus, the dimension precision in the rubbing region width direction which is orthogonal to the rubbing direction can be improved.

As described above, according to Embodiments 1 through 8, the vertical alignment films 6 and 7 (or horizontal alignment films) may be provided respectively on the substrates 1 and 2 on sides facing the liquid crystal layer 3. The vertical alignment films 6 and 7 are processed with a mask rubbing process using a hard mask in a predetermined direction. The liquid crystal layer 3 includes domains D1 to D4. In the domains D1 to D4, the liquid crystal molecules aligned in a direction substantially vertical (in the case where the horizon alignment films are used, substantially horizontal) to the principal surface of the substrates 1 and 2 when there is no driving voltage applied, and inclined in the alignment control direction defined by the mask rubbing process performed on the alignment films 6 and 7 when a voltage of a predetermined threshold value or higher is applied. This enables a liquid crystal display device which is good in both a viewing angle property and a response property, and can display at a high definition to be produced. The precision of the rubbing region can be improved by performing a rubbing process on the alignment film with at least part of the metal mask having a thickness, including the thickness of a shock-absorbing section, in the range from 30 μm to 50 μm (inclusive) and a taper angle of 60° to 70° (inclusive). Further, if shock-absorbing sections 81 are provided in the non-opened portions of the hard mask 8A on the side facing the alignment film, when the rubbing cloth jolts the hard mask, the pressure (stress) applied to the alignment surface from the hard mask can be absorbed by the shock-absorbing sections. Thus it is possible to avoid damage on the alignment film surface covered by the non-opened portions of the hard mask in terms of alignment control. This further enables a liquid crystal display device which is good in both a viewing angle property and a response property, and can display at a higher definition to be produced.

With reference to Embodiments 1 to 8, although it has not been specifically described, the present invention is superior to the conventional art, such as, Japanese Laid-Open Publication Nos. 11-352486 and 2002-277877 on the following points: the increased stability of the tilt angle; strength to pressurizing (a time period taken by the panel to recover the alignment state when the alignment state is disordered by pressing the panel with a finger); and the enhanced anchoring strength to implement the high alignment control power.

The present invention allows a split alignment process which is necessary in the vertical alignment liquid crystal display mode, by using a simple mechanical hard mask rubbing process without using a process such as ultraviolet irradiation or photolithography, which is not reliable, and can provide a liquid crystal display device having a rapid response property better than that of a conventional vertical alignment liquid crystal display mode, particularly at low temperatures and having a wide viewing angle and rapid response property and fabrication method thereof. The liquid crystal display device of the present invention, which has such superior characteristics, can be widely used in a display device for a monitor in a notebook-sized personal computer (PC) or a desktop personal computer, an LCD-TV, or the like.

The present invention has been described above with reference to the preferable basic structure and Embodiments 1 to 8 of the present invention. However, the present invention should not be construed as being limited to the basic structure and Embodiments 1 to 8. It should be recognized that the scope of the present invention is only construed by the claims. It should be recognized that those skilled in the art can implement the equivalent scope from the descriptions of the specific preferable basic structure and Embodiments 1 to 8, based on the descriptions of the present invention and common technical knowledge. It is also recognized that the patents, patent applications and documents referred herein are hereby incorporated by reference as if their entirety are described.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A fabrication method of a liquid crystal display device which displays with an alignment change in a liquid crystal layer between a pair of substrates, comprising:
    forming an alignment film on at least one of the pair of the substrates;
    performing a mask rubbing process by locating a hard mask, having an opening portion, such that at least part of the hard mask contacts the alignment film, and performing the mask rubbing process on the alignment film through the opening portion; and
    wherein the hard mask includes shock-absorbing sections on a side of the hard mask facing the alignment film.

2. A fabrication method of a liquid crystal display device according to claim 1, wherein the alignment film is at least a vertical alignment film or a horizontal alignment film.

3. A fabrication method of a liquid crystal display device according to claim 1, further comprising bonding the pair of substrates after the mask rubbing process with a predetermined interval therebetween and enclosing a liquid crystal layer in a gap between the substrates.

4. A fabrication method of a liquid crystal display device according to claim 1, wherein the mask rubbing process is performed for a plurality of times with the positions of the opening portion located with respect to the alignment film sequentially changed.

5. A fabrication method of a liquid crystal display device according to claim 4, wherein the mask rubbing process is performed with the positions of the opening portion of the hard mask shifted so as to locate the opening portion at a predetermined rubbing position.

6. A fabrication method of a liquid crystal display device according to claim 4, wherein the mask rubbing process is performed when the hard mask is replaced with a hard mask having an opening portion at different positions so as to locate the opening portion at a predetermined rubbing position.

7. A fabrication method of a liquid crystal display device according to claim 1, wherein the opening portion is located for each of pixel portions, or a plurality of sub-pixel portions forming the pixel portions to perform the mask rubbing process.

8. A fabrication method of a liquid crystal display device according to claim 1, wherein the size of the opening portion is determined in accordance with a pixel size and a pixel pitch.

9. A fabrication method of a liquid crystal display device according to claim 1, wherein the opening portion is set to be larger than a size of a pixel portion or a sub-pixel portion so that an actual rubbing process region has the size of a pixel portion or a sub-pixel portion.

10. A fabrication method of a liquid crystal display device according to claim 1, wherein the thickness of the hard mask is between 30 μm to 50 μm, inclusive.

11. A fabrication method of a liquid crystal display device according to claim 1, wherein the hard mask has a predetermined opening portion formed by an etching method.

12. A fabrication method of a liquid crystal display device according to claim 1, wherein the hard mask is a metal mask produced by an electroforming method.

13. A fabrication method of a liquid crystal display device according to claim 1, wherein a cross section of the opening portion has a taper angle less than 90°.

14. A fabrication method of a liquid crystal display device according to claim 13, wherein a cross section of the opening portion has a taper angle of 60° to 70°, inclusive.

15. A fabrication method of a liquid crystal display device according to claim 1, wherein the opening portion is provided to be larger than a domain by a predetermined amount with respect to the performing alignment process in the rubbing direction.

16. A fabrication method of a liquid crystal display device according to claim 15, wherein the predetermined amount is larger at an upstream side of the rubbing direction than at a downstream side with respect to the domain.

17. A fabrication method of a liquid crystal display device according to claim 1, wherein the liquid crystal display device is a vertical alignment type liquid crystal display device in which liquid crystal molecules of the liquid crystal layer are aligned substantially vertical to principle surfaces of the pair of the substrates when there is no voltage application.

18. A fabrication method of a liquid crystal display device according to claim 1, wherein the liquid crystal display device is a horizontal alignment type liquid crystal display device in which liquid crystal molecules of the liquid crystal layer are aligned substantially parallel to principle surfaces of the pair of the substrates when there is no voltage application.

19. A fabrication method of a liquid crystal display device including a pair of substrates, a liquid crystal layer provided between the pair of substrates, and an alignment film which is provided on at least one of the pair of the substrates on a side facing the liquid crystal layer and which forms a plurality of domains having directions, in which liquid crystal molecules of the liquid crystal layer incline when a voltage of a predetermined threshold value or higher is applied, different from each other, the method comprising:
    performing a mask rubbing process by laminating a hard mask, including an opening portion and shock-absorbing sections in non-opened portions, for forming domains such that the shock-absorbing sections contact the alignment film surface, and performing the mask rubbing process on the alignment film through the opening portion of the hard mask.

20. A fabrication method of a liquid crystal display device according to claim 19, wherein the alignment film is at least a vertical alignment film or a horizontal alignment film.

21. A fabrication method of a liquid crystal display device according to claim 19, further comprising bonding the pair of substrates after the mask rubbing process with a predetermined interval therebetween and enclosing a liquid crystal layer in a gap between the substrates.

22. A fabrication method of a liquid crystal display device according to claim 19, wherein the mask rubbing process is performed for a plurality of times with positions of the opening portion located with respect to the alignment film sequentially changed.

23. A fabrication method of a liquid crystal display device according to claim 22, wherein the mask rubbing process is performed with the positions of the opening portion of the hard mask shifted so as to locate the opening portion at a predetermined rubbing position.

24. A fabrication method of a liquid crystal display device according to claim 22, wherein the mask rubbing process is performed when the hard mask is replaced with a hard mask having an opening portion at different positions so as to locate the opening portion at a predetermined rubbing position.

25. A fabrication method of a liquid crystal display device according to claim 19, wherein the opening portion is located for each of a pixel portion, or a plurality of sub-pixel portions forming the pixel portion to perform the mask rubbing process.

26. A fabrication method of a liquid crystal display device according to claim 19, wherein the size of the opening portion is determined in accordance with a pixel size and a pixel pitch.

27. A fabrication method of a liquid crystal display device according to claim 19, wherein the opening portion is set to be larger than a size of a pixel portion or sub-pixel portion so that an actual rubbing process region has the size of the pixel portion or sub-pixel portion.

28. A fabrication method of a liquid crystal display device according to claim 19, wherein a thickness of the hard mask is between 30 µm to 50 µm, inclusive.

29. A fabrication method of a liquid crystal display device according to claim 19, wherein the hard mask has a predetermined opening portion formed by an etching method.

30. A fabrication method of a liquid crystal display device according to claim 19, wherein the hard mask is a metal mask produced by an electroforming method.

31. A fabrication method of a liquid crystal display device according to claim 19, wherein a cross section of the opening portion has a taper angle less than 90°.

32. A fabrication method of a liquid crystal display device according to claim 31, wherein a cross section of the opening portion has a taper angle of 60° to 70°, inclusive.

33. A fabrication method of a liquid crystal display device according to claim 19, wherein the shock-absorbing section is formed in parts of the non-opened portion of the hard mask on a side facing the alignment film.

34. A fabrication method of a liquid crystal display device according to claim 33, wherein the shock-absorbing section is formed in the non-opened portion on the side facing the alignment film so as to contact the alignment film surface corresponding a non-display portion in a pixel of the liquid crystal display device.

35. A fabrication method of a liquid crystal display device according to claim 19, wherein the shock-absorbing section is formed on the non-opened portion of the hard mask across an entire surface of a side facing the alignment film.

36. A fabrication method of a liquid crystal display device according to claim 19, wherein the opening portion is provided to be larger than a domain by a predetermined amount with respect to the performing alignment process in the rubbing direction.

37. A fabrication method of a liquid crystal display device according to claim 36, wherein the predetermined amount is larger at an upstream side of the rubbing direction than at a downstream side with respect to the domain.

38. A fabrication method of a liquid crystal display device according to claim 19, wherein the liquid crystal display device is a vertical alignment type liquid crystal display device in which liquid crystal molecules of the liquid crystal layer are aligned substantially vertical to principle surfaces of the pair of the substrates when there is no voltage application.

39. A fabrication method of a liquid crystal display device according to claim 19, wherein the liquid crystal display device is a horizontal alignment type liquid crystal display device in which liquid crystal molecules of the liquid crystal layer are aligned substantially parallel to principle surfaces of the pair of the substrates when there is no voltage application.

40. A fabrication method of a liquid crystal display device which displays with an alignment change in a liquid crystal layer between a pair of substrates, comprising:
    forming an alignment film on at least one of the pair of the substrates;
    performing a mask rubbing process by locating a hard mask, having an opening portion, such that at least part of the hard mask contacts the alignment film, and performing the mask rubbing process on the alignment film through the opening portion; and
    wherein a shock-absorbing section is formed in parts of the non-opened portion of the hard mask on a side facing the alignment film.

41. A fabrication method of a liquid crystal display device according to claim 40, wherein the shock-absorbing section is formed in the non-opened portion of the hard mask on the side facing the alignment film so as to contact an alignment film surface corresponding to a non-display portion in a pixel of the liquid crystal display device.

42. A fabrication method of a liquid crystal display device which displays with an alignment change in a liquid crystal layer between a pair of substrates, comprising:
    forming an alignment film on at least one of the pair of the substrates;
    performing a mask rubbing process by locating a hard mask, having an opening portion, such that at least part of the hard mask contacts the alignment film, and performing the mask rubbing process on the alignment film through the opening portion; and
    wherein a shock-absorbing section is formed on the non-opened portion of the hard mask across an entire surface of a side facing the alignment film.

* * * * *